US009572451B2

(12) United States Patent
Verbeek

(10) Patent No.: US 9,572,451 B2
(45) Date of Patent: Feb. 21, 2017

(54) DISPOSABLE PACKAGE AND SYSTEM FOR PREPARATION OF A LIQUID PRODUCT

(75) Inventor: Roland Waldemar Verbeek, Blaricum (NL)

(73) Assignee: CUPSYSTEM COMPANY B.V., Naarden (NL)

( * ) Notice: Subject to any disclaimer, the term of this patent is extended or adjusted under 35 U.S.C. 154(b) by 371 days.

(21) Appl. No.: 14/003,555

(22) PCT Filed: Mar. 6, 2012

(86) PCT No.: PCT/NL2012/050137
§ 371 (c)(1),
(2), (4) Date: Nov. 12, 2013

(87) PCT Pub. No.: WO2012/121597
PCT Pub. Date: Sep. 13, 2012

(65) Prior Publication Data
US 2014/0053735 A1    Feb. 27, 2014

Related U.S. Application Data

(60) Provisional application No. 61/506,355, filed on Jul. 11, 2011.

(30) Foreign Application Priority Data

Mar. 7, 2011  (NL) ...................................... 2006350
Sep. 2, 2011  (NL) ...................................... 2007343

(51) Int. Cl.
*A47J 31/06*  (2006.01)
*B65B 29/02*  (2006.01)
(Continued)

(52) U.S. Cl.
CPC ........ *A47J 31/3676* (2013.01); *B65D 85/8043* (2013.01)

(58) Field of Classification Search
CPC .................. A47J 31/3676; B65D 85/8043
(Continued)

(56) References Cited

U.S. PATENT DOCUMENTS

2004/0115317 A1* 6/2004 Doglioni ............. A47J 31/0673
426/123
2005/0150390 A1* 7/2005 Schifferle .......... B65D 85/8043
99/295

(Continued)

FOREIGN PATENT DOCUMENTS

CH  WO 2010128031 A1 * 11/2010 ............ A47J 31/407
DE  10 2010 030 988 A1  1/2012
(Continued)

*Primary Examiner* — Dana Ross
*Assistant Examiner* — Ket D Dang
(74) *Attorney, Agent, or Firm* — Birch, Stewart, Kolasch & Birch, LLP

(57) ABSTRACT

A disposable package having a reservoir filled with an ingredient to be combined with a base liquid. The package has a moulded plastic body with a bottom and a circumferential wall. The package is sealed by a top sealing film. The body has a column at its lower end integral with the centre of the bottom. The top sealing film is such that a base liquid feed lance can passed through the film and engage with the upper end of the column to dispense base liquid into the channel of the column. The column has apertures. The bottom has a multitude of filter holes or discharge openings, and a flexible portion around the column. A bottom sealing film is provided which breaks upon relative motion of the column to the lower operative position, creating one or more outflow openings in the film for outflow of the product from the package.

20 Claims, 15 Drawing Sheets

Figure 1:
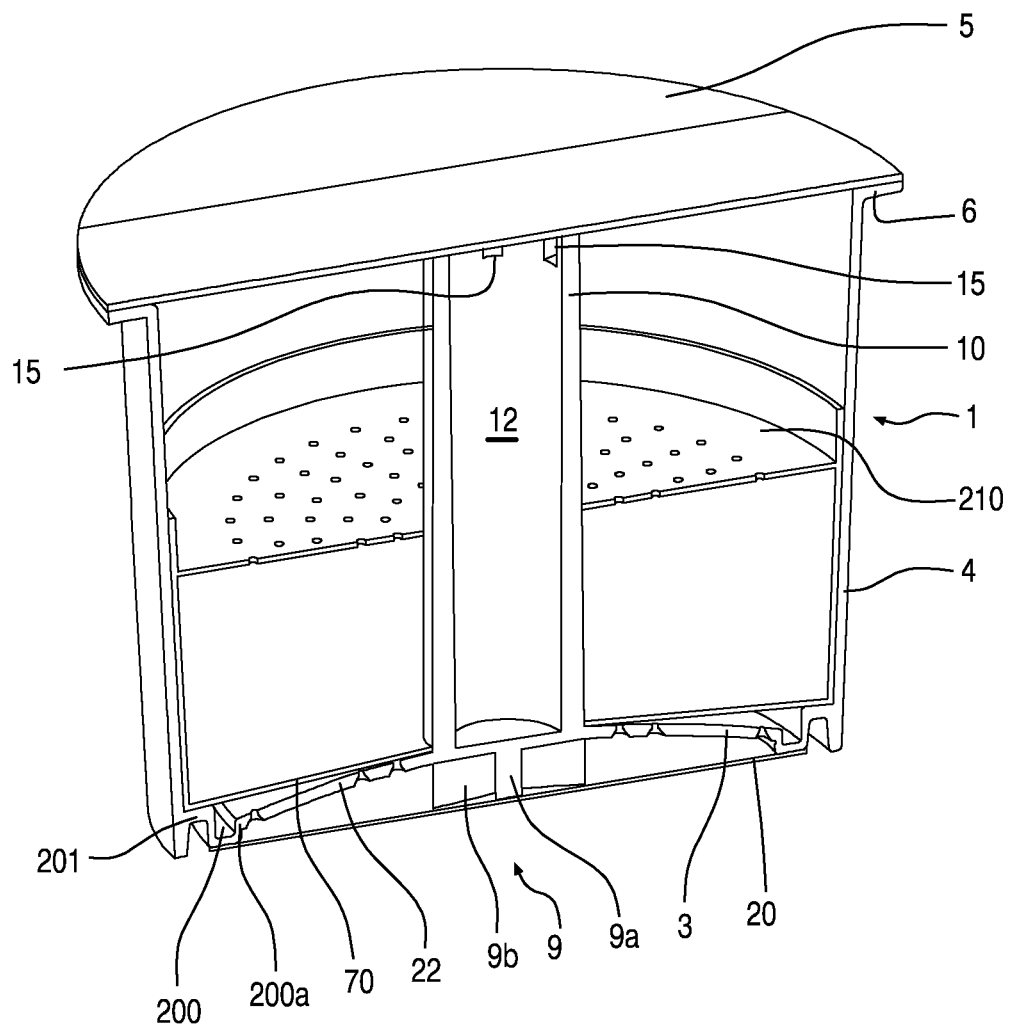

(51) Int. Cl.
*A01N 25/24* (2006.01)
*A47J 31/36* (2006.01)
*B65D 85/804* (2006.01)

(58) Field of Classification Search
USPC ............. 426/115, 77, 590, 519, 78, 79, 112; 99/295, 323, 279, 302 R; 424/77, 79, 115
See application file for complete search history.

(56) References Cited

U.S. PATENT DOCUMENTS

| | | | |
|---|---|---|---|
| 2008/0264267 A1* | 10/2008 | Doglioni Majer . | B65D 85/8043 99/295 |
| 2009/0007793 A1* | 1/2009 | Glucksman ........ | B65D 85/8043 99/287 |
| 2009/0223375 A1* | 9/2009 | Verbeek ................ | A47J 31/405 99/287 |
| 2009/0235827 A1* | 9/2009 | Bongers ............ | B65D 85/8043 99/316 |
| 2010/0064898 A1* | 3/2010 | Bongers ............ | B65D 85/8043 99/295 |
| 2010/0147156 A1* | 6/2010 | Colantonio ........ | B65D 85/8043 99/295 |
| 2013/0105340 A1 | 5/2013 | Hother et al. | |

FOREIGN PATENT DOCUMENTS

| | | |
|---|---|---|
| EP | 1 796 517 B1 | 1/2008 |
| FR | 2 556 323 A1 | 6/1985 |
| WO | WO 2007/114685 A1 | 10/2007 |
| WO | WO 2008/078990 A1 | 7/2008 |
| WO | WO 2008/132571 A1 | 11/2008 |

\* cited by examiner

DISPOSABLE PACKAGE AND SYSTEM FOR PREPARATION OF A LIQUID PRODUCT

CROSS-REFERENCE TO RELATED APPLICATIONS

This application is the National Phase of PCT/NL2012/050137 filed on Mar. 6, 2012, which claims priority under 35 U.S.C. 119(e) to U.S. Provisional Application No. 61/506,355 filed on Jul. 11, 2011 and under 35 U.S.C. 119(a) to Patent Application No. 2006350 filed in the Netherlands on Mar. 7, 2011 and Patent Application No. 2007343 filed in the Netherlands on Sep. 2, 2011, all of which are hereby expressly incorporated by reference into the present application.

The present invention relates to a disposable package having a reservoir filled with a portion of an ingredient to be combined with a base liquid, e.g. for extraction, for the preparation of a liquid product, e.g. a food product suitable for human consumption, such as coffee.

An example of a prior art disposable package for preparation of coffee and an associated preparation device is disclosed in EP 1 796 517. Herein the device comprises a pivotal punching member that is operated to punch the bottom sealing film of the package in order to create an outflow opening for the coffee.

Another example of a prior art disposable package for preparation of coffee and an associated preparation device is disclosed in FR2556323.

The present invention aims to provide measure for an improved disposable package.

A further aim is to provide a disposable package that is cost-effective to manufacture and provides good quality product, e.g. based on extraction, e.g. coffee.

A further aim is to provide a disposable package that is easily handled by the user.

According to a first aspect thereof the present invention achieves one or more of the above-mentioned objections by providing a disposable package having a reservoir filled with a portion of an ingredient to be combined with a base liquid, e.g. for extraction, for the preparation of a liquid product, e.g. a food product suitable for human consumption.

The package of the first aspect of the present invention has an injection moulded monolithic plastic body with a bottom and a circumferential wall, an upper edge of the circumferential wall bounding an aperture, which is hermetically sealed by a top sealing film fixed on its circumference on the upper edge. The plastic body furthermore has a central column which is at its lower end integral with the centre of the bottom, which column projects upwards from the bottom to an upper end of the column. The reservoir of the package surrounds the column.

A channel extends in the column, preferably centrally therein, from an inlet at the upper end of the column to a blind end, preferably near the bottom of the package. In an embodiment the blind end can also be arranged at an elevated position of the column, e.g. the column being hollow below said blind end, having an opening at the bottom side formed by a core member of the mould forming said hollow in the column.

The top sealing film is breakable, preferably pierceable, so that a base liquid feed lance can be passed through the top sealing film, be engaged with the upper end of column, and dispense base liquid into the channel.

The column, preferably at its upper end, is provided with one or more apertures that are in communication with the channel in the column and with the reservoir, possibly in absence of any permeable substrate or otherwise between said one or more apertures and the ingredient in the reservoir, so as to allow base liquid that is dispensed from the feed lance, to flow to and through the one or more apertures and then into the reservoir to be combined with the ingredient therein.

Preferably said one or more apertures in the column are formed as indentations between raised protruding bosses at the upper end of the column. This allows to form said apertures and bosses in a simple manner when injection moulding the plastic body. Also the base liquid is introduced into the reservoir at the maximum height, so that the liquid comes optimally into contact with the ingredient in the reservoir, e.g. enhancing extraction.

Optionally, an annular member is provided that is arranged at least partly within the column, between the bosses at the upper end of the column. The annular member extends over a part of at least one indentation, preferably over a part of each indentation, such that the aperture(s) through which the base liquid is introduced in the reservoir have a smaller cross sectional area. This way, small apertures can be obtained without having to make special arrangements in the injection moulding process by which the package is produced.

The provision of said apertures, preferably multiple apertures distributed around the column, allows for a reliable operation and simple design of the feed lance, preferably with a single dispensing opening therein at the front end of the feed lance, said single dispensing opening preferably having a cross-section greater than each of said apertures in the column, or more preferably greater than the total of the cross-section of all apertures.

As in many practical applications of the inventive package heated water will be used as base liquid, the possibility to have a relative large dispensing opening, or openings, in the feed lance; allows to avoid, or at least reduce, any problem of clogging of openings in the feed lance due to scaling, as is observed in prior art devices with small sized openings in the base liquid feed lance.

The apertures may be sized suitable to obtain a strong jet of base liquid into the reservoir if desired. Also the orientation of the apertures, e.g. radial or more tangential to the column, can be effectively produced in the inventive package.

The provision of said apertures in the column allows to design apertures in a manner that is optimal for the ingredient in the package, so that one and the same feed lance and base liquid supply regime (e.g. pump pressure and/or flow rate of the base liquid) may be used in the same device in combination with packages having different ingredients, said packages differing with respect to the design of the apertures to obtain different flow regimes of base liquid into the reservoir.

Optionally, above the bottom of the plastic body of the package, an annular filter of a suitable filtering material is mounted in the plastic body, said filter having a central opening through which the column projects, the inner circumference and the outer circumference of the filter preferably being secured to the plastic body, preferably said filter being made of one or more layers of filter material, e.g. plastic filtering material.

The bottom is embodied as a closed bottom with a number, preferably a multitude, of discharge openings therein for the product or with a multitude of filter holes, so that the liquid introduced via the feed lance into the reservoir interacts with the ingredient and the product thus obtained flows out of the reservoir through the one or more discharge openings or filter holes in the bottom.

If the bottom is moulded as a filter bottom, that is preferably in direct contact with the ingredient so without any additional filtering substrate to be placed between the bottom and the ingredient which facilitates simple and cost-effective production of filled packages.

The filter bottom has a multitude of filter holes, said holes being formed in the process of injection moulding the plastic body to enhance cost-effective production. The base liquid that is introduced via the feed lance into the reservoir interacts with the ingredient, e.g. to cause extraction, and the liquid product thus obtained flows out of the reservoir via the holes in the filter bottom.

The invention allows for a rather thin walled filter bottom of the injection moulded plastic body, thus making production of the body more efficient and saving on plastic material, taking into account that during preparation of the product significant forces may act on the filter bottom, e.g. due to base liquid pressure within the reservoir and/or forces exerted by the feed lance (e.g. with a design having a flexible bottom and a column on which the feed lance acts).

The bottom can be provided with discharge openings instead of filter holes when no filtering action is required, or when an annular filter as described above is present to perform the filtering function.

The bottom has an annular flexible portion around the column such that the column is movable, preferably elastically movable, downwards from an initial position to a lower operative position through engagement with feed lance and suitable relative displacement of the feed lance and the package.

Preferably the bottom is provided on its underside with multiple integrally moulded spacer formations that are adapted to keep the bottom sealing film, spaced from the filter bottom as well as to support the filter bottom, said spacer formations maintaining a space between the bottom and the bottom sealing film, the product emerging from the filter holes or discharge openings entering said space and flowing towards the one or more outflow openings, preferably an outflow opening centrally in the bottom sealing film.

Preferably, if filter holes are present, the filter holes are provided at least in said annular flexible portion.

Preferably, in the initial position, the upper end of the column extends up to the top sealing film.

The package is provided with a bottom sealing film fixed at is circumference to the plastic body and extending underneath the filter bottom, which bottom seal film is adapted to break upon relative motion of the column and of the bottom to the lower operative position, said breakage creating one or more outflow openings in the bottom sealing film allowing for outflow of the obtained product from the package. For packages in accordance with other aspects of the invention, the bottom sealing film is optional.

As will be appreciated the disposable package provided with such a bottom sealing film requires no additional provision of a bottom film breaking, e.g. punching, member on the preparation and dispensing device, as relative motion of the feed lance with respect to the upper edge of the package causes the effective opening of the bottom sealing film.

In an alternative the bottom sealing film is absent from the package. For example it is envisaged that the package is delivered in an outer protective envelope, e.g. a metallic layered plastic foil envelope, from which the package is removed by the user.

Advantageously, for this and any other aspect of the invention, the ingredient is granular, e.g. ground coffee. The reservoir can contain multiple ingredients when desired, advantageously all granular ingredients. The granular ingredient(s) can be filled into the reservoir with some compaction thereof (e.g. lightly) to form a compacted mass of ingredient within the reservoir.

A second aspect of the invention relates to a disposable package having a reservoir filled with a portion of an ingredient to be combined with a base liquid, e.g. for extraction, for the preparation of a liquid product, e.g. a food product suitable for human consumption.

The package has an injection moulded monolithic plastic body with a bottom and a circumferential wall, an upper edge of the circumferential wall bounding an aperture, which is hermetically sealed by a top sealing film fixed on its circumference on the upper edge.

The top sealing film is breakable, preferably pierceable, so that a base liquid feed lance can be passed through the top sealing film and dispense base liquid into the reservoir.

The bottom is embodied as a filter bottom, that is preferably in direct contact with the ingredient, the filter bottom having a multitude of filter holes, said holes being formed in the process of injection moulding the plastic body, so that the liquid introduced via the feed lance into the reservoir interacts with the ingredient and the product thus obtained flows out of the reservoir via the filter bottom.

The package may be provided with a bottom sealing film fixed at its circumference to the plastic body and extending underneath the filter bottom, which bottom seal film is adapted to be broken, e.g. pierced, said breakage creating one or more outflow openings in the bottom sealing film allowing for outflow of the obtained product from the package.

The second aspect of the invention aims to allow for a rather thin walled filter bottom of the injection moulded plastic body, thus making production of the body more efficient and saving on plastic material, taking into account that during preparation of the product significant forces may act on the filter bottom, e.g. due to base liquid pressure within the reservoir and/or forces exerted by the feed lance (e.g. with a design having a flexible bottom and a column on which the feed lance acts).

According to the second aspect of the invention the filter bottom is provided on its underside with multiple integrally moulded spacer formations that are adapted to keep the bottom sealing film,—or in absence of such a film a bottom support surface of a holder in the preparation device—, spaced from the filter bottom as well as to support the filter bottom, said spacer formations maintaining a space between the bottom and the bottom sealing film, the product emerging from the filter holes entering said space and flowing towards the one or more outflow openings, preferably a single outflow opening centrally in the bottom sealing film.

The bottom can be designed as a flexible bottom that is movable between an initial position and an operative position, e.g. as disclosed with reference to the first aspect of the invention or e.g. moving under the influence of liquid pressure within the reservoir. However, the bottom may also be designed to remain stationary with respect to the remainder of the plastic body, e.g. the bottom sealing film being pierced by an external member, e.g. as shown in FR2556323.

Preferably the filter holes are arranged in groups of multiple holes, the distance between filter holes within a group being less than the distance between neighbouring groups of filter holes.

Preferably at least one spacer formation is provided at each group of filter holes, preferably a single spacer formation, e.g. a star shaped spacer formation having a central portion and arms directed away from said central portion, the filter holes being each located between adjacent arms of the spacer formation, e.g. four filter holes in combination with a four armed star shaped spacer formation.

The third aspect of the invention relates to a disposable package having a reservoir filled with a portion of an ingredient to be combined with a base liquid, e.g. for extraction, for the preparation of a liquid product, e.g. a food product suitable for human consumption.

The package has an injection moulded plastic body with a bottom and a circumferential wall, an upper edge of the circumferential wall bounding an aperture, which is hermetically sealed by a top sealing film fixed on its circumference on the upper edge.

The top sealing film is breakable, preferably pierceable, so that a base liquid feed lance can be passed through the top sealing film and dispense base liquid into the reservoir.

The bottom is moulded as a filter bottom, that is preferably in direct contact with the ingredient, the filter bottom having a multitude of filter holes, said holes being formed in the process of injection moulding the plastic body, so that the liquid introduced via the feed lance into the reservoir interacts with the ingredient and the product thus obtained flows out of the reservoir via the filter bottom.

The package may be provided with a bottom sealing film fixed at is circumference to the plastic body and extending underneath the filter bottom, which bottom seal film is adapted to be broken, e.g. pierced, said breakage creating one or more outflow openings in the bottom sealing film allowing for outflow of the obtained product from the package.

The third aspect of the present invention aims to provide a design of the filter bottom that allows for efficient injection moulding of the plastic body, whilst allowing to obtain groups of small and effective filter holes therein.

According to the third aspect of the invention a portion of the filter bottom wherein a group of multiple filter holes is moulded, has a filter bottom wall between an upper surface and a bottom surface thereof. A bore common to said group of filter holes extends through said wall, and said bore has a cross-section greater than the combined cross-section of said filter holes of the group. A spacer formation is integrally moulded onto the bottom surface of said wall, said spacer formation extending across the projection of the bore and having a top surface that is coplanar with the bottom surface of the wall, so as to create at least two filter holes each having a cross-section coplanar with said bottom surface and having substantially no axial extension.

This design of the filter bottom allows for efficient moulding of the package. A pin shaped mould portion forming the bore can, in the closed and operative condition of the mould, rest with its end face against a counter mould portion having a recess therein forming the spacer formation. The areas of contact between the front end of the pin shaped mould portion and the counter mould portion form the filter holes, which effectively have no axial length.

This design of the group of filter holes also allows for high quality filtering, e.g. with ground coffee, wherein the majority of the solids are stopped from passing along with the obtained liquid product, and wherein e.g. oils and other fine suspended solids are allowed to pass the filter holes.

Preferably for each bore a single spacer formation is provided, more preferably a star shaped spacer formation having a central portion and arms directed away from said central portion, the filter holes being each located between adjacent arms of the spacer formation, e.g. four filter holes in combination with a four armed star shaped spacer formation.

In a practical embodiment the central portion of the spacer formation is arranged in the projection of the centre of the common bore and has a cross-section smaller then the bore at the bottom surface of said wall, and said arms extend from said central portion outward, so as to form said multiple filter holes, preferably four filter holes.

The third aspect of the invention also relates to a disposable package having a reservoir filled with a portion of an ingredient to be combined with a base liquid, e.g. for extraction, for the preparation of a liquid product, e.g. a food product suitable for human consumption, e.g. ground coffee.

The package has an injection moulded monolithic plastic filter member, e.g. a filter bottom, that is preferably in direct contact with the ingredient, the filter member having a multitude of filter holes, said holes being formed in the process of injection moulding the member, so that the liquid introduced into the reservoir interacts with the ingredient and the product then passes through the filter holes.

A portion of the filter member, wherein a group of multiple filter holes is moulded, has a filtering wall between an upper surface and a bottom surface thereof. A bore common to said group of filter holes extends through said wall, and said bore has a cross-section greater than the combined cross-section of said filter holes of the group. A spacer formation is integrally moulded onto the bottom surface of said wall, said spacer formation extending across the projection of the bore and having a top surface that is coplanar with the bottom surface of the wall, so as to create at least two filter holes each having a cross-section coplanar with said bottom surface and having substantially no axial extension.

It will be appreciated that the filter member of the third aspect of the invention may be moulded as a separate part, e.g. to be positioned in a capsule for coffee preparation.

In a preferred embodiment the filter member is embodied as the filter bottom, that is integrally moulded with a circumferential wall of a plastic body of a disposable package for preparation of a liquid product.

In a possible embodiment a column as disclosed herein may be integrally moulded with the filter member embodied as filter bottom, e.g. the filter bottom being flexible.

The third aspect of the invention also relates to a method for manufacturing a disposable package filled with an ingredient, e.g. ground coffee, and having a filter member, e.g. a filtering wall, wherein at least the filter member is injection moulded from plastic material, and wherein a pin shaped mould portion forming the bore, in the closed and operative condition of the mould, rests with its end face against a counter mould portion having a recess therein forming the spacer formation. The areas of contact between the front end of the pin shaped mould portion and the counter mould portion form the filter holes in the finally produced package. These holes effectively have no axial length.

It will be appreciated that further optional, possibly preferred, details may be combined with the second and/or third aspect of the invention. Some of these details are present below.

In a preferred embodiment, groups of filter holes are arranged on concentric circles, e.g. with a cutter member in the centre of the bottom, adapted to cut the bottom film.

In a preferred embodiment the plastic body furthermore has a central column which is at its lower end integral with the centre of the bottom, which column projects upwards from the bottom to an upper end of the column, the reservoir of the package surrounding said column. Preferably the feed lance is adapted to engage on the upper end of the column, e.g. to exert a downward pressure on the bottom to keep the bottom sealing film clamped between said spacer formations and an underlying bottom support surface of a holder for the package, which holder forms part of the device. It will be appreciated that even with a stationary design of the filter bottom, this will enhance keeping the bottom film in its desired position and keeping the space between the filter bottom and the film in predetermined and reproducible shape.

In a possible embodiment a channel extends in the column from an inlet at the upper end of the column to a blind end, preferably near the bottom, the feed lance being adapted to be engaged with the upper end of column, and dispense base liquid into the channel.

In a preferred embodiment the column, preferably at its upper end, is provided with one or more apertures that are in communication with the channel in the column and with the reservoir, so as to allow base liquid that is dispensed from the feed lance, to flow to and through the one or more apertures and then into the reservoir to be combined with the ingredient therein, wherein, preferably, said one or more apertures in the column are formed as indentations between raised protruding bosses at the upper end of the column.

In a preferred embodiment the bottom is flexible, such that the filter bottom is movable, preferably elastically movable, downwards from an initial position to a lower operative position. For example said motion is caused by liquid pressure in the reservoir upon the start of liquid feed into said reservoir. In a preferred embodiment the bottom has an annular flexible portion around the column when present such that the column is movable, preferably elastically movable, downwards from an initial position to a lower operative position through engagement with feed lance and suitable relative displacement of the feed lance and the package. Preferably the filter holes are provided at least in said annular flexible portion.

The fourth aspect of the invention relates to a disposable package and a device for the preparation of a liquid food product and to the combination so as to form a system.

The disposable package has a reservoir filled with a portion of an ingredient to be combined with a base liquid, e.g. for extraction, for the preparation of a liquid product, e.g. a food product suitable for human consumption.

The package has an injection moulded plastic body with a bottom and a circumferential wall, an upper edge of the circumferential wall bounding an aperture, which is hermetically sealed by a top sealing film fixed on its circumference on the upper edge.

The plastic body furthermore has a central column which is at its lower end integral with the centre of the bottom, which column projects upwards from the bottom to an upper end of the column, the reservoir of the package surrounding said column. The feed lance of the device is adapted to engage on the upper end of the column and connect to a channel in said column, said channel extending in the column from an inlet at the upper end of the column to a blind end, preferably near the bottom.

The top sealing film is breakable, preferably pierceable, so that a base liquid feed lance can be passed through the top sealing film, and connect to the channel to dispense base liquid into the channel.

The column, preferably at its upper end, is provided with one or more apertures that are in communication with the channel in the column and with the reservoir, so as to allow base liquid that is dispensed from the feed lance, to flow to and through the one or more apertures and then into the reservoir to be combined with the ingredient therein, wherein, preferably, said one or more apertures in the column are formed as indentations between raised protruding bosses at the upper end of the column.

According to the fourth aspect of the invention, the column, preferably at its upper end, is provided with one or more apertures that are in communication with the channel in the column and with the reservoir, possibly in absence of any permeable (e.g. filtering) substrate or otherwise between said one or more apertures and the ingredient in the reservoir, so as to allow base liquid that is dispensed from the feed lance, to flow to and through the one or more apertures and then into the reservoir to be combined with the ingredient therein.

Preferably said one or more apertures in the column are formed as indentations between raised protruding bosses at the upper end of the column. This allows to form said apertures and bosses in a simple manner when injection moulding the plastic body. Also the base liquid is introduced into the reservoir at the maximum height, so that the liquid comes optimally into contact with the ingredient in the reservoir, e.g. enhancing extraction.

The provision of said apertures, preferably multiple apertures distributed around the column, allows for a reliable operation and simple design of the feed lance, preferably with a single dispensing opening therein at the front end of the feed lance, said single dispensing opening preferably having a cross-section greater than each of said apertures in the column, or more preferably greater than the total of the cross-section of all apertures.

As in many practical applications of the inventive package heated water will be used as base liquid, the possibility to have a relative large dispensing opening, or openings, in the feed lance; allows to avoid, or at least reduce, any problem of clogging of openings in the feed lance due to scaling, as is observed in prior art devices with small sized openings in the base liquid feed lance.

The bottom can be embodied as a filter bottom. Possibly the bottom is in direct contact with the ingredient. Possibly the moulded filter bottom has a multitude of filter holes, said holes being formed in the process of injection moulding the plastic body, so that the liquid introduced via the feed lance into the reservoir interacts with the ingredient and the product thus obtained flows out of the reservoir via the filter bottom. In another embodiment the bottom has one or more relative large sized discharge openings, that are too big to act as filter holes and keep the (majority of) the (granular) ingredient in the reservoir, a filter member is then provided in the plastic body, e.g. above and spaced from the bottom.

The package may be provided with a bottom sealing film fixed at is circumference to the plastic body and extending underneath the filter bottom, which bottom seal film is adapted to be broken, e.g. pierced, said breakage creating one or more outflow openings in the bottom sealing film allowing for outflow of the obtained product from the package.

It will be appreciated that further optional or preferred details may be combined with the fourth aspect of the present invention. Some of these are listed here below.

In a preferred embodiment, in case a filter bottom is present, groups of filter holes are arranged on concentric circles, e.g. with a cutter member in the centre of the bottom, adapted to cut the bottom film.

In a preferred embodiment the bottom is flexible, such that the filter bottom is movable, preferably elastically movable, downwards from an initial position to a lower operative position. For example said motion is caused by liquid pressure in the reservoir upon the start of liquid feed into said reservoir. In a preferred embodiment the bottom has an annular flexible portion around the column such that the column is movable, preferably elastically movable, downwards from an initial position to a lower operative position through engagement with feed lance and suitable relative displacement of the feed lance and the package. If the bottom is provided with filter holes, preferably the filter holes are provided at least in said annular flexible portion.

A fifth aspect of the invention relates to a disposable package having a reservoir filled with a portion of an ingredient to be combined with a base liquid, e.g. for extraction, for the preparation of a liquid product, e.g. a food product suitable for human consumption, which package has an injection monolithic moulded plastic body with a bottom and a circumferential wall, an upper edge of the circumferential wall bounding an aperture which is hermetically sealed by a top sealing film fixed on its circumference to the upper edge, the plastic body furthermore having a central column which is at its lower end integral with the centre of the bottom, which column projects upwards from the bottom to an upper end of the column, the reservoir of the package surrounding said column.

A channel extends in the column from an inlet at the upper end of the column to a blind end, preferably near the bottom.

The top sealing film is breakable, preferably pierceable, so that a base liquid feed lance can be passed through the top sealing film, be engaged with the upper end of column, and dispense base liquid into the channel.

The column, preferably at its upper end, is provided with one or more apertures that are in communication with the channel in the column and with the reservoir, so as to allow base liquid that is dispensed from the feed lance, to flow to and through the one or more apertures and then into the reservoir to be combined with the ingredient therein, wherein, preferably, said one or more apertures in the column are formed as indentations between raised protruding bosses at the upper end of the column.

Spaced above the bottom of the plastic body an annular filter of suitable filtering material is mounted in the plastic body, said filter having a central opening through which the column projects, the inner circumference and outer circumference of the filter being fixed to the plastic body, preferably the bottom having multiple raised spacer formations extending upwardly from a main wall of the bottom to support the filter and maintain a space between the filter and the bottom, preferably said filter being made of one or more layers of filter material, e.g. plastic filtering material.

The bottom is embodied as a closed bottom with a number of discharge openings from the product that has passed through the filter therein, preferably said one or more discharge openings being arranged in the bottom adjacent the column, so that the liquid introduced via the feed lance into the reservoir interacts with the ingredient and the product thus obtained flows out of the reservoir through the filter and then the one or more discharge openings in the bottom.

The bottom has an annular flexible portion around the column such that the column is movable, preferably elastically movable, downwards from an initial position to a lower operative position through engagement with feed lance and suitable relative displacement of the feed lance and the package.

Preferably, in the initial position, the upper end of the column extends up to the top sealing film.

The package is optionally provided with a bottom sealing film fixed at is circumference to the plastic body and extending underneath the filter bottom, which bottom seal film is adapted to break upon relative motion of the column and of the bottom to the lower operative position, said breakage creating one or more outflow openings in the bottom sealing film allowing for outflow of the obtained product from the package.

In a preferred embodiment of a package according to fifth aspect of the invention the bottom is provided with at least one integrally moulded cutter member on its underside, facing the bottom sealing film, more preferably a single cutter member on the bottom arranged centrally below the column, said cutter member enhancing the breaking of the bottom sealing film so as to form an outflow opening for the obtained product.

In a practical embodiment the bottom has three discharge openings adjacent the foot of the column.

In a practical embodiment a foot portion of the column includes a circumferential shoulder onto which the filter is fixed.

In a practical embodiment a foot portion of the column comprises multiple radial arm segments, preferably three radial arm segments, said radial arm segments being at an outer end thereof integral with the bottom of the plastic body, wherein a discharge opening is delimited between a pair of arm segments.

In a practical embodiment the column has a foot portion with a conical face having a downwardly directed tip forming a single cutter member of the package, and the one or more discharge openings are oriented with their main cross-section substantially vertically such that the flow of product is deviated by contact with said conical face towards the outflow opening formed by action of the cutter member.

It will be appreciated that further optional or preferred details may be combined with the any of the aspects of the present invention, as well as that aspects of the present invention can be employed in combination. Some of the further optional or preferred details are listed below.

In a practical embodiment of one or more aspects of the invention the base liquid feed lance is connected to a pump, e.g. an electric pump, of the device to supply said base liquid to the lance.

In a practical embodiment of one or more aspects of the invention the base liquid is water, e.g. heated water.

In a practical embodiment of one or more aspects of the invention the base liquid feed means of the device comprise a heating assembly for heating the liquid, preferably an electric heating assembly for supplying hot, not boiling liquid, preferably water, preferably hotter than 70° C.

In a practical embodiment of one or more aspects of the invention the base liquid feed means comprise a supply storage tank for storage of a supply of the liquid.

In a practical embodiment of one or more aspects of the invention the lance and the inlet of the channel of a column of the package, when present, are such that a front portion of the lance projects into the inlet of the channel of the package.

In a practical embodiment of one or more aspects of the invention the device is embodied such that the lance is stationary in the device, and the displacement means are equipped to move a holder supporting the package towards the lance and away from it, in such a way that in the process the lance connects to the package.

In a practical embodiment of one or more aspects of the invention the lance is disposed in the device so as to be movable and is movable by means of corresponding first displacement means of the device, and in which the holder for the package is likewise movable by means of corresponding second displacement means of the device, in which during use of the system when the second displacement means are operated the holder and the package accommodated and retained in it move to the dispensing position in the device, and in which when subsequently operated, preferably on the basis of a specific operation instruction from the user, the first displacement means move the lance in such a way that the lance connects to the package, e.g. pierces the top sealing film, e.g. is introduced into a channel of a column in the package.

In a practical embodiment the device comprises a holder for the package, e.g. a mobile holder, e.g. a drawer-type holder, which holder is equipped to accommodate and retain the package in a substantially horizontal position with the bottom downwards, the holder having an aperture below the projected outflow aperture of the package to receive the stream of product. The aperture of the holder can be such that during dispensing of the product, the product stream remains clear of the holder. In another embodiment the holder comprises a duct leading the stream of liquid product to a remote dispensing aperture.

In a practical embodiment of one or more aspects of the invention—at a distance below the dispensing position of the holder for the package—the device has a standing place for a beverage holder, for example a mug.

In a practical embodiment of one or more aspects of the invention the preparation device is furthermore provided with an additional preparation and dispensing assembly for preparing, on the basis of a second ingredient, which differs from the ingredient in the first package, a second, different food product suitable for human consumption, for example a foamed milk, e.g. as the first package contains an ingredient to prepare coffee.

In a practical embodiment of one or more aspects of the invention the additional preparation and dispensing assembly is adapted for accommodating and retaining a second disposable package filled with the second ingredient, for example a foamed milk preparation ingredient, e.g. a liquid milk product. In a practical embodiment the second package differs from the first package, at least as regards its dimensions. Preferably, the first package is a package according to any of the aspects of the invention.

In a practical embodiment the second ingredient is intended for combination with the same base liquid as the ingredient in the first package, for example with water (e.g. hot water), in which case the additional preparation and dispensing assembly is connected to the liquid feed means and is adapted to dispense the second ingredient combined with the liquid.

In a practical embodiment of one or more aspects of the invention the first and/or second package is filled with a single portion of the ingredient, so as to obtain a single serving of the product, e.g. a single serving coffee product, such as an espresso, regular coffee, Americano, etc.

In a practical embodiment of one or more aspects of the invention the device comprises a common carrier for a first and for a second package, which carrier forms the holder for the first package and for the second package.

In a practical embodiment the second package is embodied as a disposable package having a reservoir filled with a portion of an ingredient to be mixed with a base liquid, for the preparation of a liquid product, e.g. a food product suitable for human consumption, e.g. foamed milk, which package has an injection moulded monolithic plastic body with a bottom and a circumferential wall, an upper edge of the circumferential wall bounding an aperture, which is hermetically sealed by a top sealing film fixed on its circumference on the upper edge, the plastic body furthermore having a central column which is at its lower end integral with the centre of the bottom, which column projects upwards from the bottom to an upper end of the column, the reservoir of the package surrounding said column, wherein a channel extends in the column from an inlet at the upper end of the column to a venturi portion of the channel, wherein the top sealing film is breakable, preferably pierceable, so that a base liquid feed lance can be passed through the top sealing film, be engaged with the upper end of column, and dispense base liquid into the channel, wherein the bottom has an annular flexible portion around the column such that the column is movable, preferably elastically movable, downwards from an initial position to a lower operative position through engagement with feed lance and suitable relative displacement of the feed lance and the package, wherein the package is provided with a bottom sealing film fixed at is circumference to the plastic body and extending underneath the bottom, which bottom sealing film is adapted to break upon relative motion of the column and of the bottom to the lower operative position, said breakage creating one or more outflow openings in the bottom sealing film allowing for outflow of the obtained product from the package, and wherein one or more passages formed in the column for the ingredient are connected to the venturi portion, in such a way that when base liquid is fed through the channel a venturi effect occurs and the ingredient goes from the reservoir through the one or more passages into the venturi portion and mixes there with the base liquid, which mixture is dispensed at the outflow aperture of the channel at the lower end of the column.

In a practical embodiment of one or more aspects of the invention the column of the package (when present in combination with a flexible bottom of the package) is movable between a higher initial position and a lower operative position relative to the upper edge of the body, preferably with a height difference of at least 3 millimeters.

In a possible, yet less preferred, embodiment of or alternative to any of the aspects of the invention the column is not integrally moulded in one step with the remainder of the plastic body, but manufactured as a separate member that is then mounted onto the bottom of the package, e.g. snap fitted onto the bottom, e.g. as a column member is snap fitted in a collar moulded on the bottom of the body. Other fastening techniques, e.g. with welding, adhesive, or otherwise are also possible. This requires an additional assemblage step to assemble the column onto the body, but said step could be done by a robot.

An advantage thereof could be that more complex columns are possible, e.g. with one or more apertures in the column at rather complex locations and/or of complex shapes, as now a specific mould can be provided for the column only.

In a practical embodiment of one or more aspects of the invention the plastic body of the package is designed such that it forms a supporting surface of the package, which supporting surface lies at a distance below the bottom sealing film, so that the bottom sealing film lies higher up than any bearing surface when the package is placed on it.

In a possible embodiment the circumferential wall projects below the bottom and has a lower edge which forms a supporting surface of the package, so that the package can be placed with the lower edge of the circumferential wall in a stable position on a bearing surface and the bottom sealing film in this case lies higher up than said bearing surface.

In a practical embodiment of one or more aspects of the invention the plastic body has on the upper edge of the circumferential wall an outwardly directed circumferential flange on which the top sealing film is fixed.

In a practical embodiment of one or more aspects of the invention the flexible bottom has an elastically shape-recovering flexible portion around the column, so that the column is movable downwards relative to the upper edge of the circumferential wall from an initial position to a lower operative position, and after dispensing of the product is movable back up again in a shape-recovering manner.

In a practical embodiment of one or more aspects of the invention the bottom sealing film is fixed on the underside of the bottom in a rigid annular region around a flexible portion of the bottom.

The aspects of the invention also relate to the use of the package for the preparation of a product, e.g. a food product, e.g. a beverage, e.g. a coffee product.

The aspects of the invention also relate to a method for preparation of a product, e.g. a food product, e.g. a beverage, e.g. a coffee product, wherein use is made of a package and/or system as disclosed herein.

The invention also relates to a disposable package that has a reservoir filled with a portion of an ingredient to be combined with a base liquid, e.g. for extraction, for the preparation of a liquid product, e.g. a food product suitable for human consumption. The package has an injection moulded monolithic plastic body with a bottom and a circumferential wall, an upper edge of the circumferential wall bounding an aperture, which is hermetically sealed by a top sealing film fixed on its circumference on the upper edge. The top sealing film is breakable, preferably pierceable, so that a base liquid feed lance can be passed through the top sealing film and dispense base liquid into the reservoir.

In this embodiment, the bottom is embodied as a filter bottom, that is preferably in direct contact with the ingredient. The filter bottom has a multitude of filter holes, said holes being formed in the process of injection moulding the plastic body, so that the liquid introduced via the feed lance into the reservoir interacts with the ingredient and the product thus obtained flows out of the reservoir via the filter bottom.

In this embodiment, the package optionally is provided with a bottom sealing film fixed at its circumference to the plastic body and extending underneath the filter bottom, which bottom seal film is adapted to be broken, e.g. pierced, said breakage creating one or more outflow openings in the bottom sealing film allowing for outflow of the obtained product from the package.

In this embodiment, the filter bottom is provided on its underside with multiple integrally moulded spacer formations that are adapted to keep the bottom sealing film, or in absence of such a film a bottom support surface of a preparation device, spaced from the filter bottom as well as to support the filter bottom, said spacer formations maintaining a space between the bottom and the bottom sealing film, the product emerging from the filter holes entering said space and flowing towards the one or more outflow openings, preferably a single outflow opening centrally in the bottom sealing film.

The invention also relates to a disposable package that has a reservoir filled with a portion of an ingredient to be combined with a base liquid, e.g. for extraction, for the preparation of a liquid product, e.g. a food product suitable for human consumption. The package has an injection moulded plastic body with a bottom and a circumferential wall, an upper edge of the circumferential wall bounding an aperture, which is hermetically sealed by a top sealing film fixed on its circumference on the upper edge. The top sealing film is breakable, preferably pierceable, so that a base liquid feed lance can be passed through the top sealing film and dispense base liquid into the reservoir.

In this embodiment, the bottom is moulded as a filter bottom, that is preferably in direct contact with the ingredient. The filter bottom has a multitude of filter holes, said holes being formed in the process of injection moulding the plastic body, so that the liquid introduced via the feed lance into the reservoir interacts with the ingredient and the product thus obtained flows out of the reservoir via the filter bottom.

In this embodiment, the package is optionally provided with a bottom sealing film fixed at its circumference to the plastic body and extending underneath the filter bottom, which bottom seal film is adapted to be broken, e.g. pierced, said breakage creating one or more outflow openings in the bottom sealing film allowing for outflow of the obtained product from the package.

In this embodiment, a portion of the filter bottom in which a group of multiple filter holes is moulded, has a filter bottom wall between an upper surface and a bottom surface thereof, wherein a bore common to said group of filter holes extends through said wall, and said bore has a cross-section greater than the combined cross-section of said filter holes of the group. A spacer formation is integrally moulded onto the bottom surface of said wall, said spacer formation extending across the projection of the bore and having a top surface that is coplanar with the bottom surface of the wall, so as to create at least two filter holes each having a cross-section coplanar with said bottom surface and having substantially no axial extension.

The invention also relates to a disposable package that has a reservoir filled with a portion of an ingredient to be combined with a base liquid, e.g. for extraction, for the preparation of a liquid product, e.g. a food product suitable for human consumption. The package has an injection moulded plastic body with a bottom and a circumferential wall, an upper edge of the circumferential wall bounding an aperture, which is hermetically sealed by a top sealing film fixed on its circumference on the upper edge.

In this embodiment, the plastic body furthermore has a central column which is at its lower end integral with the centre of the bottom, which column projects upwards from the bottom to an upper end of the column, the reservoir of the package surrounding said column. The feed lance of the device is adapted to engage on the upper end of the column and connect to a channel in said column, which channel extends in the column from an inlet at the upper end of the column to a blind end, preferably near the bottom.

In this embodiment, the top sealing film is breakable, preferably pierceable, so that a base liquid feed lance can be passed through the top sealing film, and connect to the channel to dispense base liquid into the channel.

In this embodiment, the column, preferably at its upper end, is provided with one or more apertures that are in communication with the channel in the column and with the reservoir, so as to allow base liquid that is dispensed from the feed lance, to flow to and through the one or more apertures and then into the reservoir to be combined with the ingredient therein. Preferably, said one or more apertures in the column are formed as indentations between raised protruding bosses at the upper end of the column.

In this embodiment, the column, preferably at its upper end, is provided with one or more apertures that are in communication with the channel in the column and with the reservoir, preferably in absence of any permeable (e.g. filtering) substrate or otherwise between said one or more apertures and the ingredient in the reservoir, so as to allow base liquid that is dispensed from the feed lance, to flow to and through the one or more apertures and then into the reservoir to be combined with the ingredient therein.

The invention also relates to a disposable package that has a reservoir filled with a portion of an ingredient to be combined with a base liquid, e.g. for extraction, for the preparation of a liquid product, e.g. a food product suitable for human consumption. The package has an injection monolithic moulded plastic body with a bottom and a circumferential wall, an upper edge of the circumferential wall bounding an aperture which is hermetically sealed by a top sealing film fixed on its circumference to the upper edge, the plastic body furthermore having a central column which is at its lower end integral with the centre of the bottom, which column projects upwards from the bottom to an upper end of the column, the reservoir of the package surrounding said column.

In this embodiment, a channel extends in the column from an inlet at the upper end of the column to a blind end, preferably near the bottom.

In this embodiment, the top sealing film is breakable, preferably pierceable, so that a base liquid feed lance can be passed through the top sealing film, be engaged with the upper end of column, and dispense base liquid into the channel.

In this embodiment, the column, preferably at its upper end, is provided with one or more apertures that are in communication with the channel in the column and with the reservoir, so as to allow base liquid that is dispensed from the feed lance, to flow to and through the one or more apertures and then into the reservoir to be combined with the ingredient therein. Preferably, said one or more apertures in the column are formed as indentations between raised protruding bosses at the upper end of the column.

In this embodiment, spaced above the bottom of the plastic body an annular filter of suitable filtering material is mounted in the plastic body, said filter having a central opening through which the column projects, the inner circumference and outer circumference of the filter being fixed to the plastic body. Preferably the bottom has multiple raised spacer formations extending upwardly from a main wall of the bottom to support the filter and maintain a space between the filter and the bottom, preferably said filter being made of one or more layers of filter material, e.g. plastic filtering material.

In this embodiment, the bottom is embodied as a closed bottom with a number of discharge openings from the product that has passed through the filter therein. Preferably said one or more discharge openings are arranged in the bottom adjacent the column, so that the liquid introduced via the feed lance into the reservoir interacts with the ingredient and the product thus obtained flows out of the reservoir through the filter and then the one or more discharge openings in the bottom.

In this embodiment, the bottom has an annular flexible portion around the column such that the column is movable, preferably elastically movable, downwards from an initial position to a lower operative position through engagement with feed lance and suitable relative displacement of the feed lance and the package.

In this embodiment, preferably, in the initial position, the upper end of the column extends up to the top sealing film.

In this embodiment, the package is optionally provided with a bottom sealing film fixed at is circumference to the plastic body and extending underneath the filter bottom, which bottom seal film is adapted to break upon relative motion of the column and of the bottom to the lower operative position, said breakage creating one or more outflow openings in the bottom sealing film allowing for outflow of the obtained product from the package.

The invention also relates to a disposable package that has a reservoir filled with a portion of an ingredient to be combined with a base liquid, which package has an injection moulded monolithic plastic body with a bottom and a circumferential wall, an upper edge of the circumferential wall bounding an aperture which is hermetically sealed by a top sealing film fixed on a circumference thereof to the upper edge. The plastic body furthermore has a central column which is at a lower end thereof integral with the centre of the bottom, which column projects upwards from the bottom to an upper end of the column, the reservoir of the package surrounding said column. In this exemplary embodiment, a channel extends in the column from an inlet at the upper end of the column to a blind end, In this exemplary embodiment, the top sealing film is breakable, so that a base liquid feed lance can be passed through the top sealing film, be engaged with the upper end of the column, and dispense base liquid into the channel.

In this exemplary embodiment, the column is provided with one or more apertures that are in communication with the channel in the column and with the reservoir allowing base liquid dispensed from the feed lance to flow to and through the one or more apertures and then into the reservoir in order to be combined with the ingredient therein.

In this exemplary embodiment, the bottom is embodied as a filter bottom having a multitude of filter holes, said holes being formed in the process of injection moulding the plastic body, so that liquid introduced via the feed lance into the reservoir interacts with the ingredient and the product thus obtained flows out of the reservoir via the filter bottom.

In this exemplary embodiment, the bottom has an annular flexible portion around the column such that the column is movable downwards from an initial position to a lower operative position through engagement with the feed lance and a relative displacement of the feed lance with respect to the package.

In this exemplary embodiment, the package is optionally provided with a bottom sealing film fixed at a circumference thereof to the plastic body and extending underneath the filter bottom, which bottom seal film is adapted to break upon relative motion of the column and of the bottom to the lower operative position, said breakage creating one or more outflow openings in the bottom sealing film allowing for outflow of the obtained product from the package.

In this exemplary embodiment, if a bottom seal is present, the bottom is optionally provided with at least one integrally moulded cutter member on its underside, facing the bottom sealing film, preferably a single cutter member on the bottom arranged centrally below the column, said cutter member enhancing the breaking of the bottom sealing film so as to form an outflow opening for the obtained product. Optionally, further at least one spacer formation is provided at of near each filter hole.

In this exemplary embodiment, optionally the filter bottom is provided on its underside with multiple integrally moulded spacer formations that are adapted to keep the bottom sealing film spaced from the filter bottom as well as to support the filter bottom in the operative position of the bottom, said spacer formations maintaining a space between the bottom and the bottom sealing film, or in absence of said bottom sealing film a bottom support surface of a preparation device, in the operative position of the bottom, the product emerging from the filter holes entering said space and flowing towards the one or more outflow openings, preferably a single outflow opening centrally in the bottom sealing film.

In this exemplary embodiment, optionally the flexible portion of the filter bottom presents multiple coaxial annular segments, an innermost segment adjoining the lower end of the column, an outermost segment adjoining the circumferential wall of the plastic body, and preferably with one or more intermediate annular segments, wherein multiple of said annular segments are each provided with multiple filter holes that are distributed in circumferential direction of the segment. Optionally, further—in the initial position—the innermost segment is at a greater height above the bottom sealing film than the outermost segment, each possible intermediate segment being at an intermediate height, said height increasing stepwise from the outermost segment towards the innermost segment.

In this exemplary embodiment, optionally the filter holes are arranged in groups of multiple holes, the distance between filter holes within a group being less than the distance between neighbouring groups of filter holes. Optionally, further at least one spacer formation is provided at each group of filter holes, preferably a single spacer formation, e.g. a star shaped spacer formation having a central portion and arms directed away from said central portion, the filter holes being each located between adjacent arms of the spacer formation, e.g. four filter holes in combination with a four armed star shaped spacer formation.

In this exemplary embodiment, optionally a portion of the filter bottom wherein a group of multiple filter holes is moulded, has a filter bottom main wall between an upper surface and a bottom surface thereof, and a bore common to said group of filter holes extends through said wall, said bore having a cross-section greater than the combined cross-section of said group of filter holes. A spacer formation is integrally moulded onto the bottom surface of said wall, said spacer formation extending across the projection of the bore and having a top surface that is coplanar with the bottom surface of the main wall, so as to create at least two filter holes each having a cross-section coplanar with said bottom surface and having substantially no axial extension.

If this option is present, and if at least one spacer formation is provided at each group of filter holes, preferably a single spacer formation, e.g. a star shaped spacer formation having a central portion and arms directed away from said central portion, the filter holes being each located between adjacent arms of the spacer formation, e.g. four filter holes in combination with a four armed star shaped spacer formation, then optionally the central portion of the spacer formation is arranged in the projection of the centre of the common bore, and has a cross-section smaller then the bore at the bottom surface of said wall, and wherein said arms extend from said central portion outward, so as to form said multiple filter holes, preferably four filter holes.

The invention further pertains to a system for the preparation of a liquid product, e.g. a food product suitable for human consumption, for example a beverage or a component of a beverage, which system comprises a first package according to the invention, and also a device, the device being at least provided with:

a holder for accommodating and retaining the first package at a dispensing position in the device, a base liquid feed assembly with a base liquid feed lance disposed at the dispensing position, which feed lance is adapted to be passed through the top sealing film of the first package, for example by piercing the top sealing film, and to connect to the channel in the column of the first package, so that base liquid can be fed to the channel through the feed lance and via said channel introduced into the reservoir so as to interact with the ingredient therein, e.g. through extraction, an operable displacement assembly which is adapted to produce a movement of the holder for the first package and the feed lance relative to each other, so that when the displacement assembly is operated the feed lance passes through the top sealing film, engages on the column as well as connects to the channel therein, for example piercing the top sealing film, the engagement of the lance on the column and continued relative displacement pressing the column downward to reach the operative position, thereby breaking the bottom sealing film, if present, and creating at least one outflow opening therein allowing the liquid product to be dispensed through the outflow opening, and wherein the package is a disposable package that has a reservoir filled with a portion of an ingredient to be combined with a base liquid, which package has an injection moulded monolithic plastic body with a bottom and a circumferential wall, an upper edge of the circumferential wall bounding an aperture which is hermetically sealed by a top sealing film fixed on a circumference thereof to the upper edge, wherein the plastic body furthermore has a central column which is at a lower end thereof integral with the centre of the bottom, which column projects upwards from the bottom to an upper end of the column, the reservoir of the package surrounding said column. In this exemplary embodiment, a channel extends in the column from an inlet at the upper end of the column to a blind end, and wherein the top sealing film is breakable, so that a base liquid feed lance can be passed through the top sealing film, be engaged with the upper end of the column, and dispense base liquid into the channel, and wherein the column is provided with one or more apertures that are in communication with the channel in the column and with the reservoir allowing base liquid dispensed from the feed lance to flow to and through the one or more apertures and then into the reservoir in order to be combined with the ingredient therein and wherein the bottom is embodied as a filter bottom having a multitude of filter holes, said holes being formed in the process of injection moulding the plastic body, so that liquid introduced via the feed lance into the reservoir interacts with the ingredient and the product thus obtained flows out of the reservoir via the filter bottom, and wherein the bottom has an annular flexible portion around the column such that the column is movable downwards from an initial position to a lower operative position through engagement with the feed lance and a relative displacement of the feed lance with respect to the package, and wherein the package is optionally provided with a bottom sealing film fixed at a circumference thereof to the plastic body and extending underneath the filter bottom, which bottom seal film is adapted to break upon relative motion of the column and of the bottom to the lower operative position, said breakage creating one or more outflow openings in the bottom sealing film allowing for outflow of the obtained product from the package.

In this system, optionally the one or more apertures in the column are located at a greater height above the filter bottom then the one or more dispensing openings of the feed lance when a front end portion of said feed lance is inserted into the channel, and wherein said front end portion of the feed lance is dimensioned so as to leave a passage, e.g. an annular passage, between the feed lance and the column such that said one or more dispensing openings in the feed lance are in communication with said apertures in the column. Optionally, further the front end face of the feed lance is spaced from the blind end of the channel when the lance is inserted into the channel.

In this system, optionally the feed lance comprises a shoulder engaging on the upper end of the column, clamping the top sealing foil in between the shoulder and the column. Optionally, further the front end face of the feed lance is spaced from the blind end of the channel when the lance is inserted into the channel.

In this system, optionally the holder for the package forms a cavity adapted to receive the package, with a bottom support surface and a circumferential surface, said bottom support surface having a central opening through which the product passes, preferably contactless, upon outflow of product from the package, wherein, preferably, said bottom support surface slopes downwards towards the central opening. Optionally, further the system uses a package in which the filter bottom is provided on its underside with multiple integrally moulded spacer formations that are adapted to keep the bottom sealing film spaced from the filter bottom as well as to support the filter bottom in the operative position of the bottom, said spacer formations maintaining a space between the bottom and the bottom sealing film, or in absence of said bottom sealing film a bottom support surface of a preparation device, in the operative position of the bottom, the product emerging from the filter holes entering said space and flowing towards the one or more outflow openings, preferably a single outflow opening centrally in the bottom sealing film, and—in the operative position—the feed lance causes the filter bottom to be pressed towards the bottom support surface of the cavity, such that the spacer formations support the filter bottom, and such that the bottom sealing film, if present, is clamped between said multitude of spacer formations and the bottom support surface of the cavity.

The invention also pertains to a method for the preparation and dispensing of a product, e.g. a coffee beverage, wherein use is made of a disposable package and/or system according to the invention.

Figure 2:
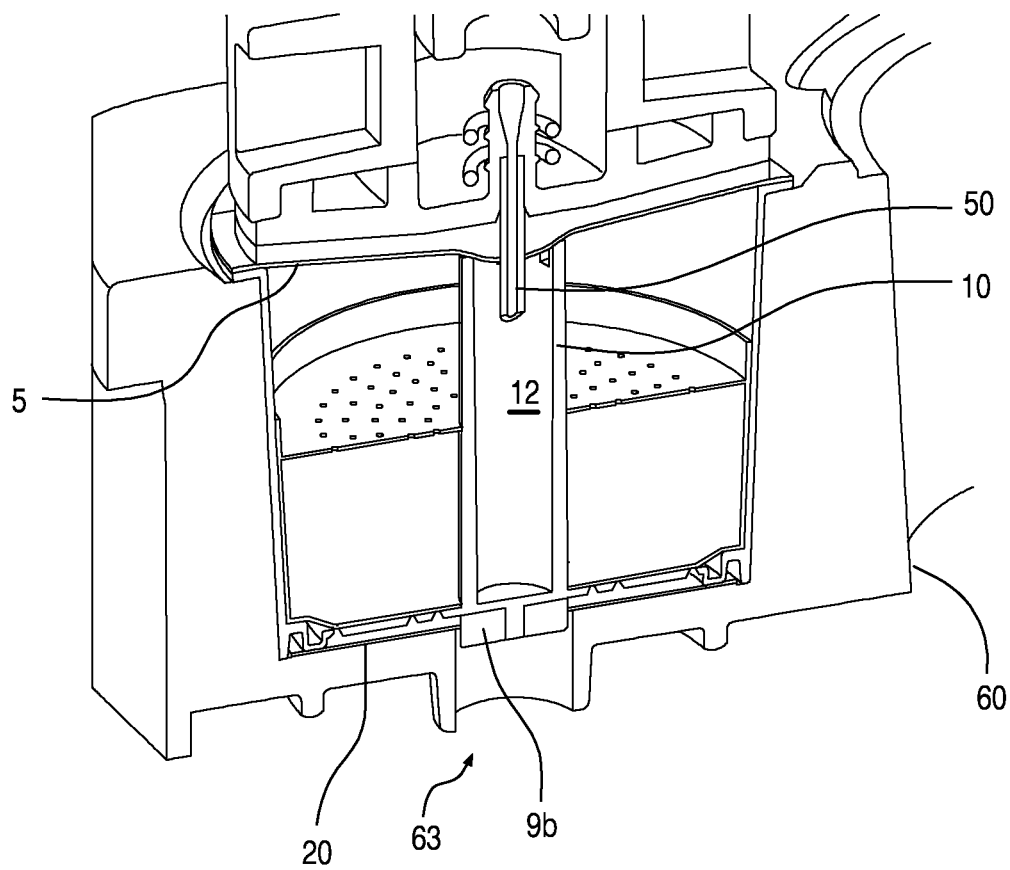
Figure 3:
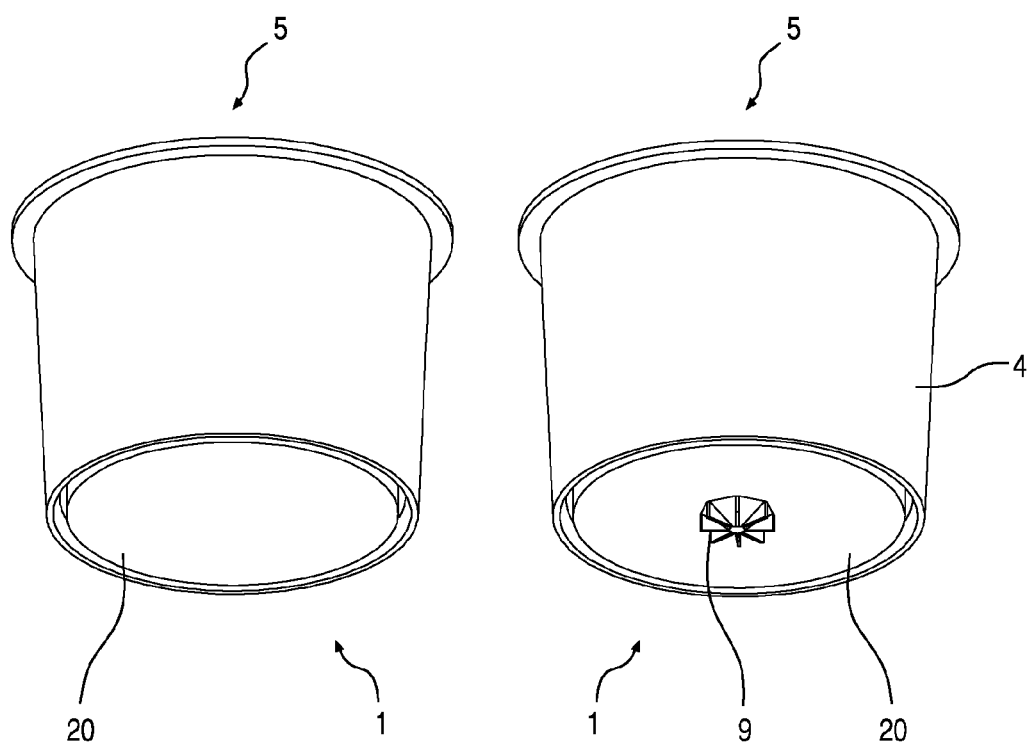
Figure 4:
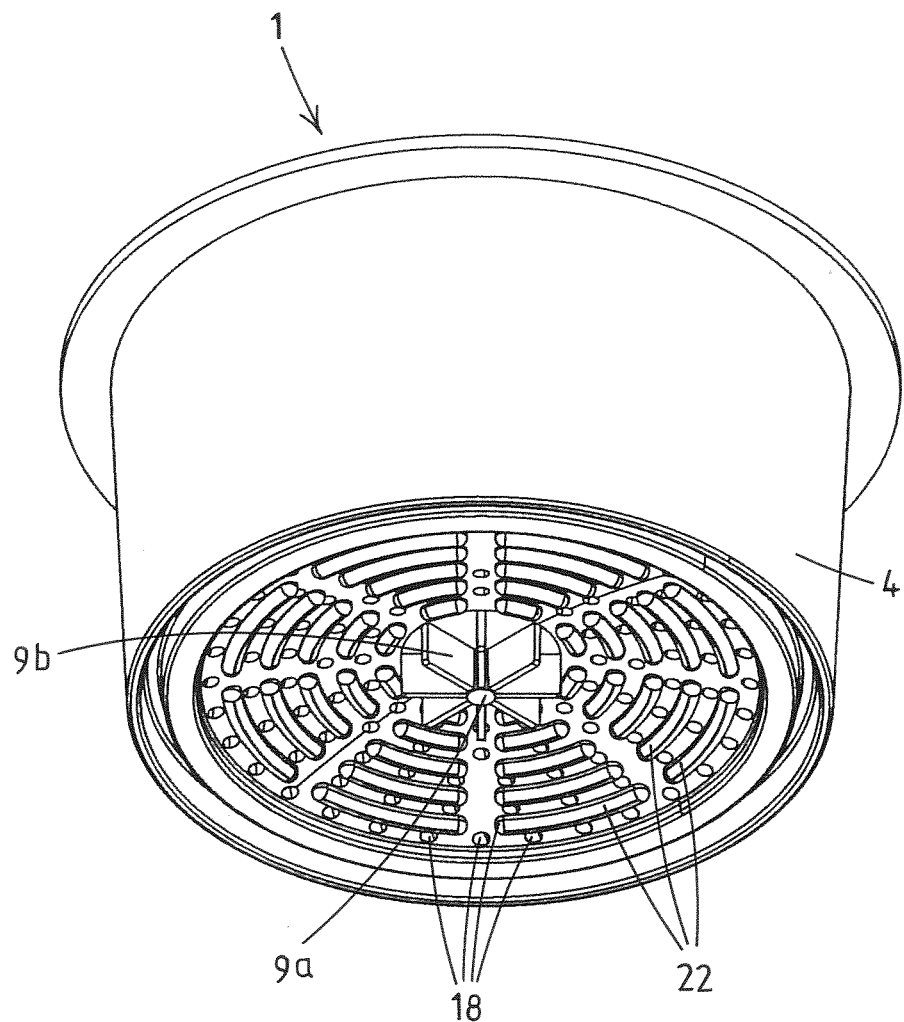
Figure 5:
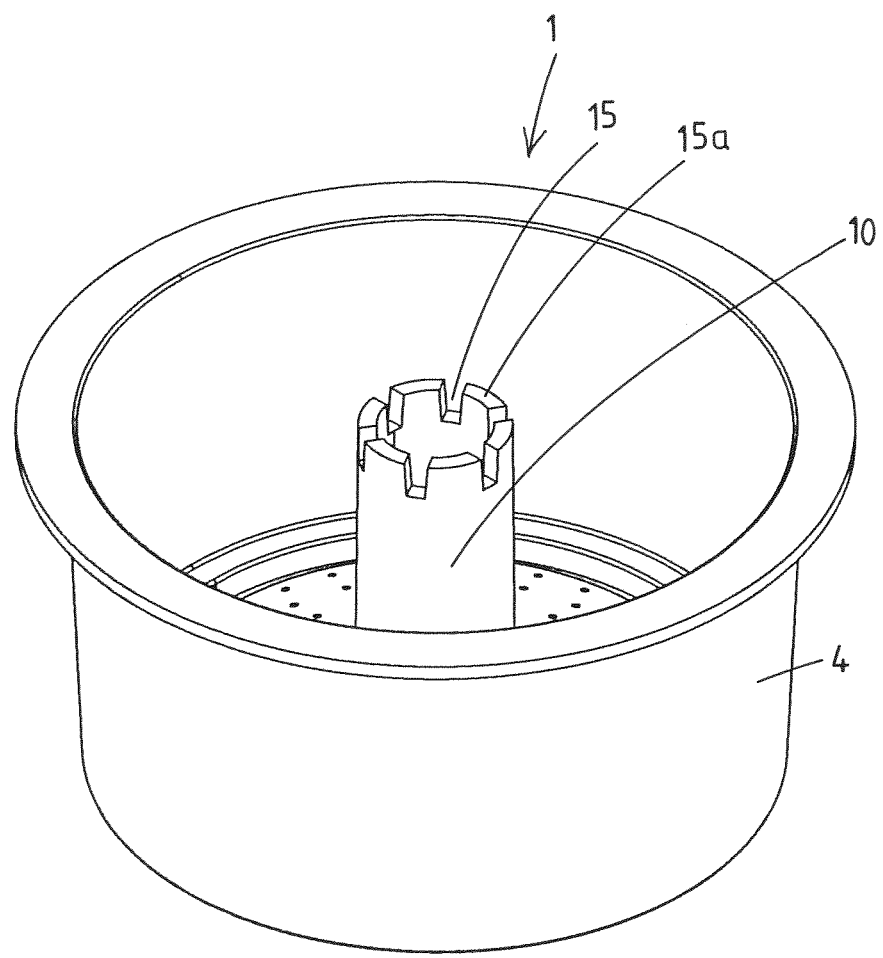
Figure 6:
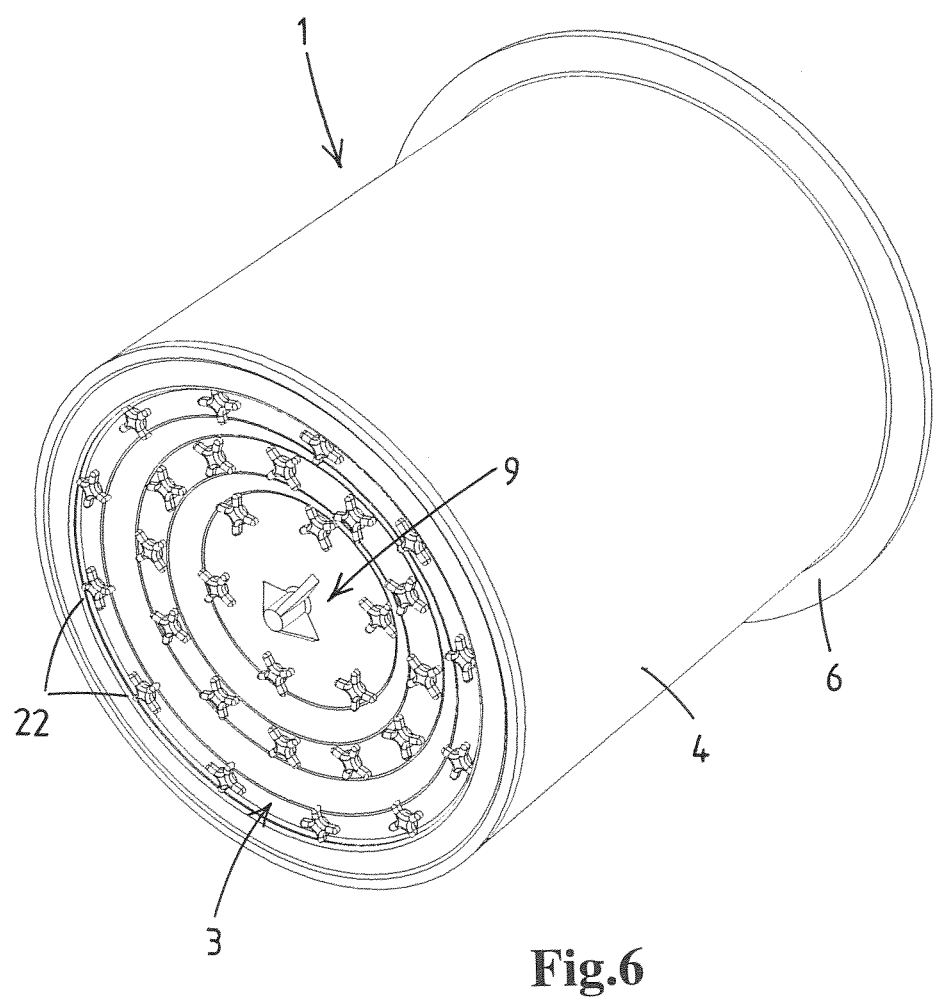
Figure 7:
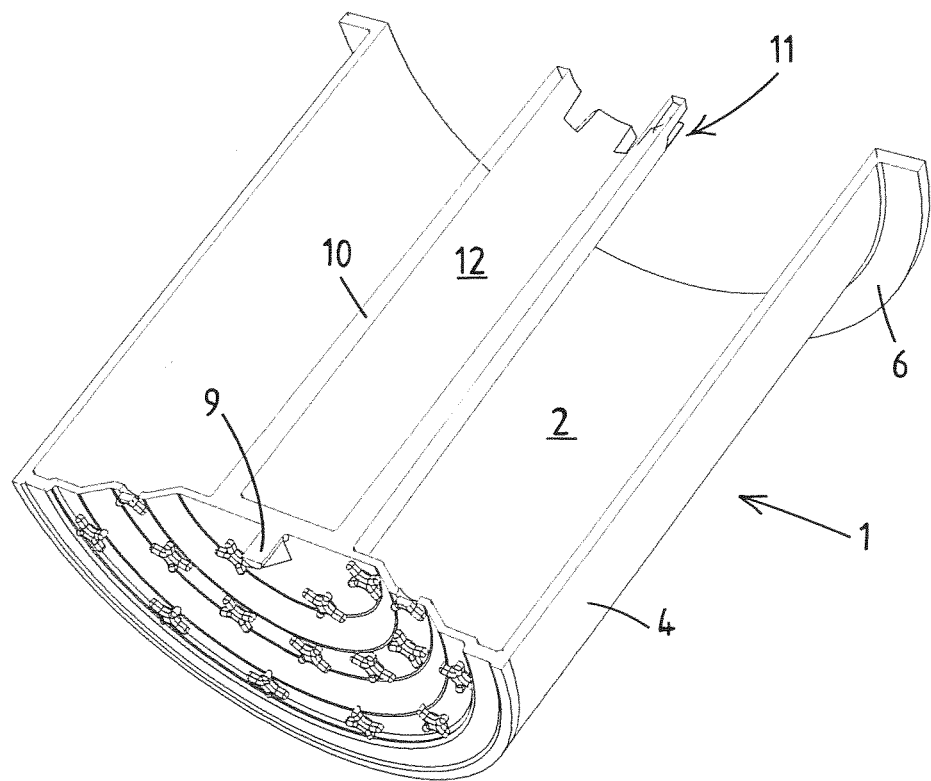
Figure 8:
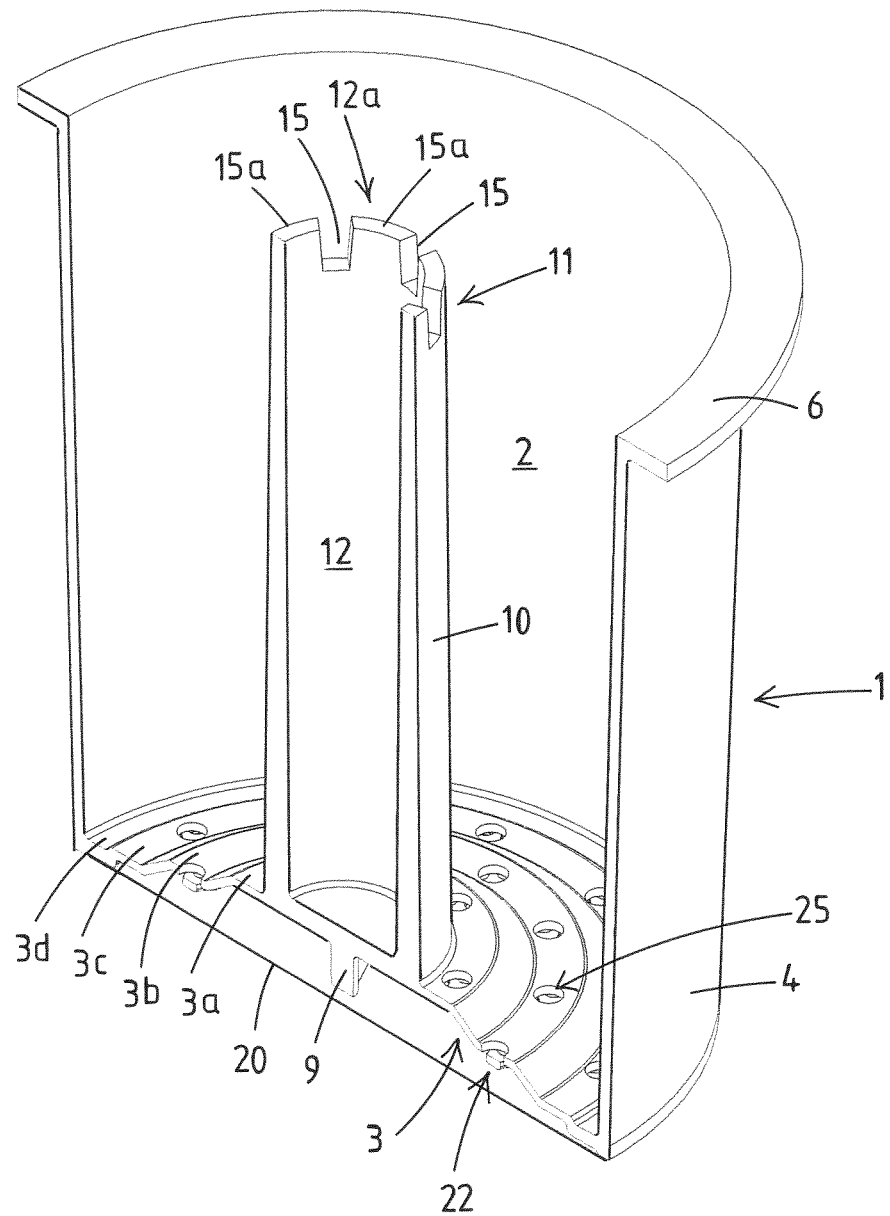
Figure 9:
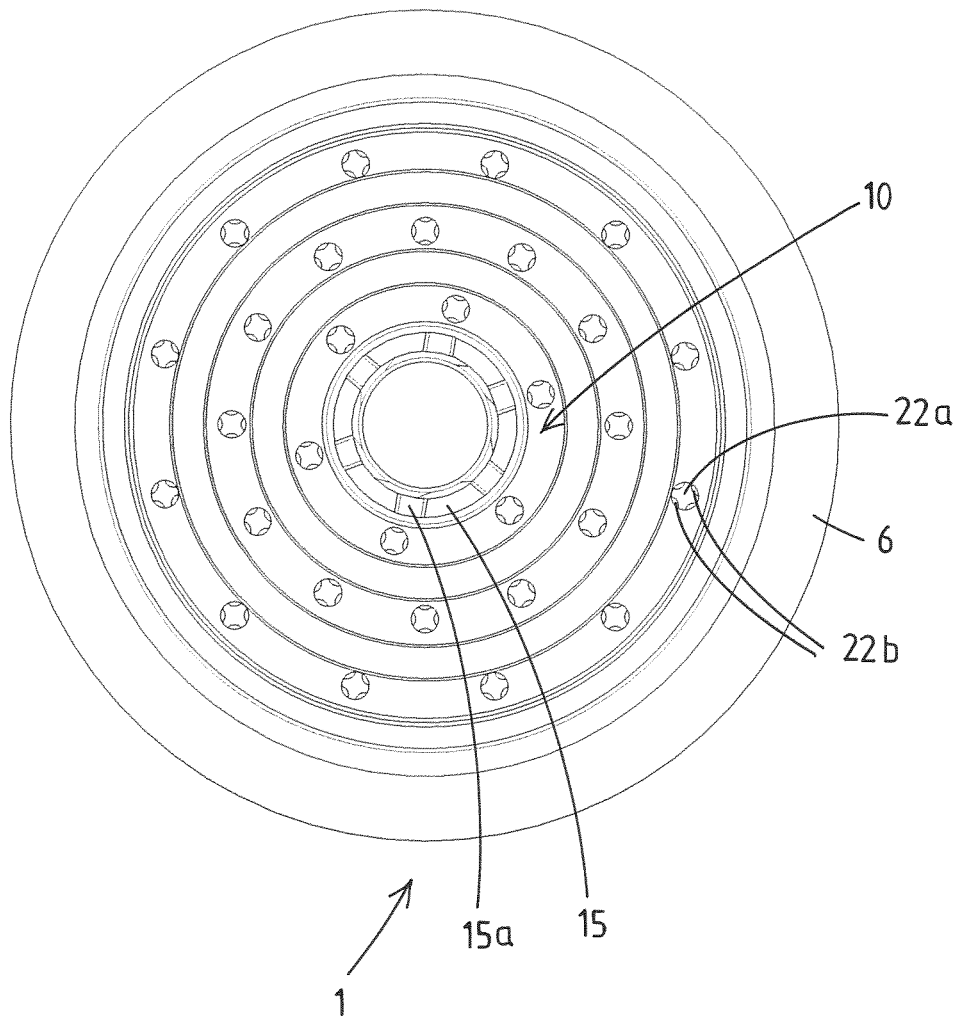
Figure 10:
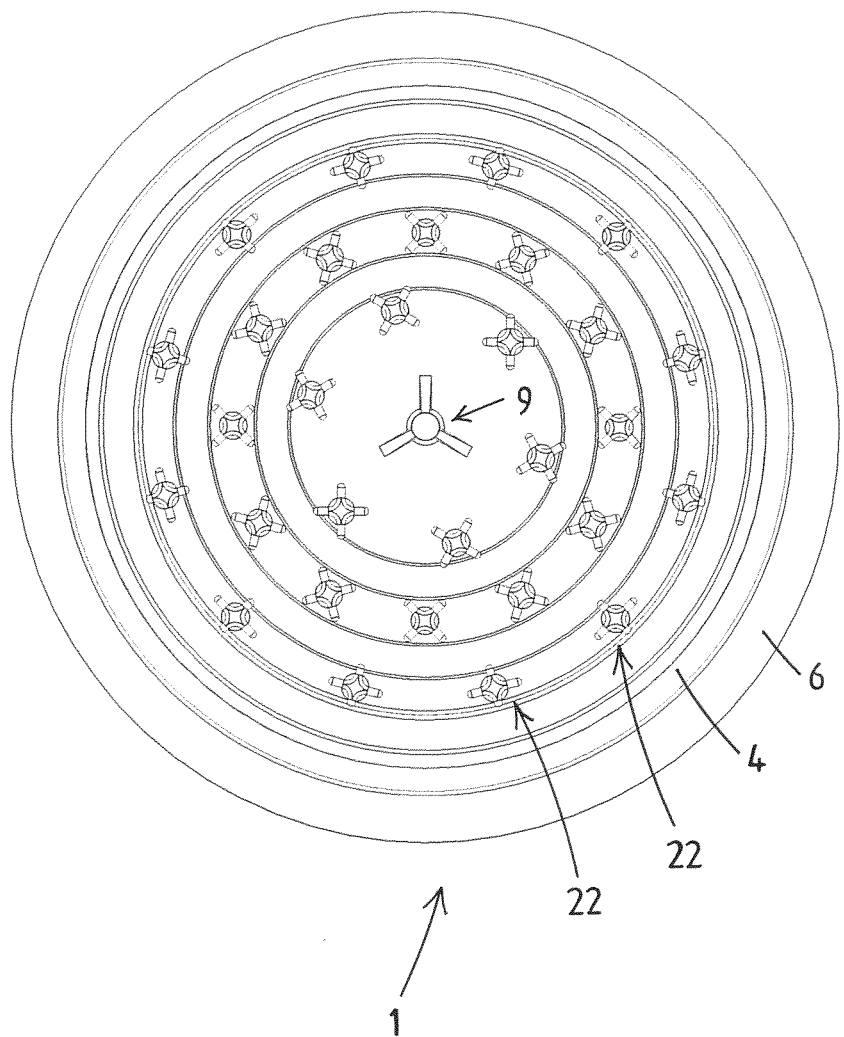
Figure 11:
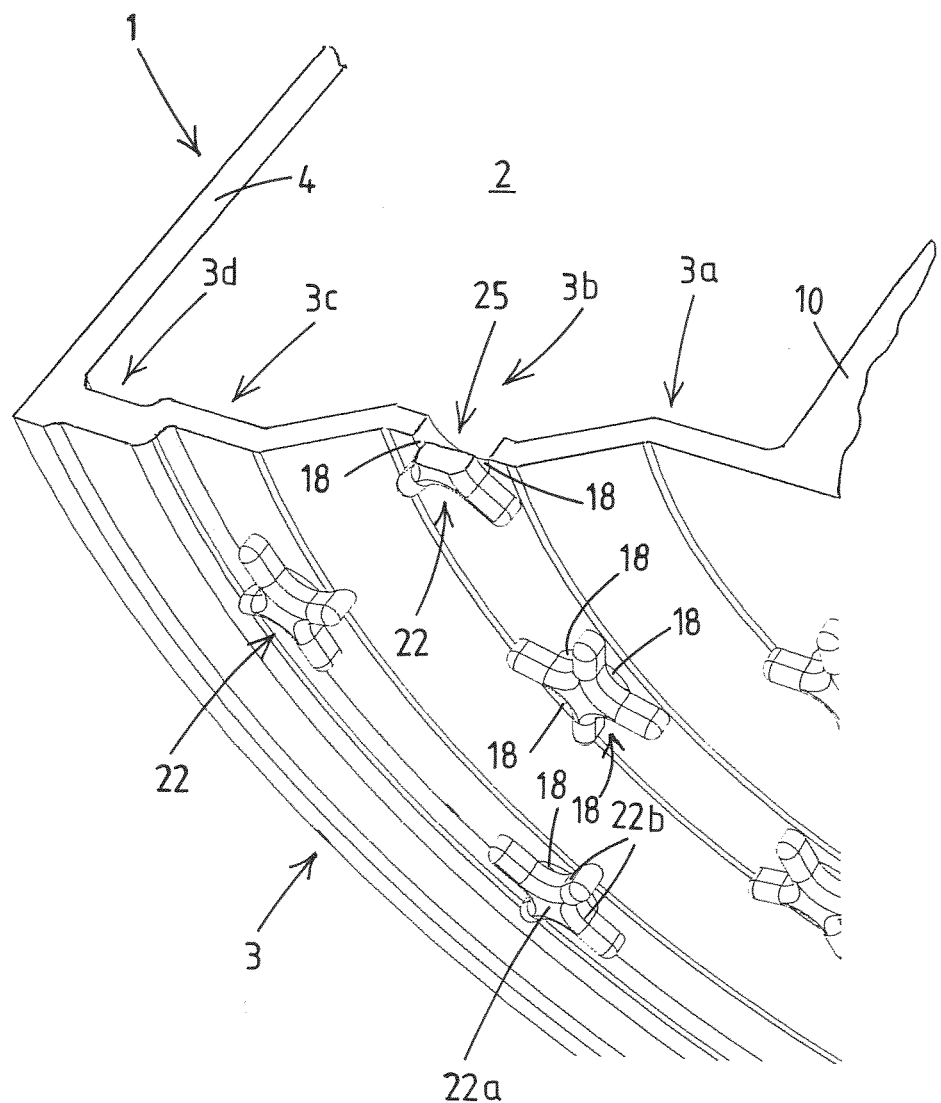
Figure 12:
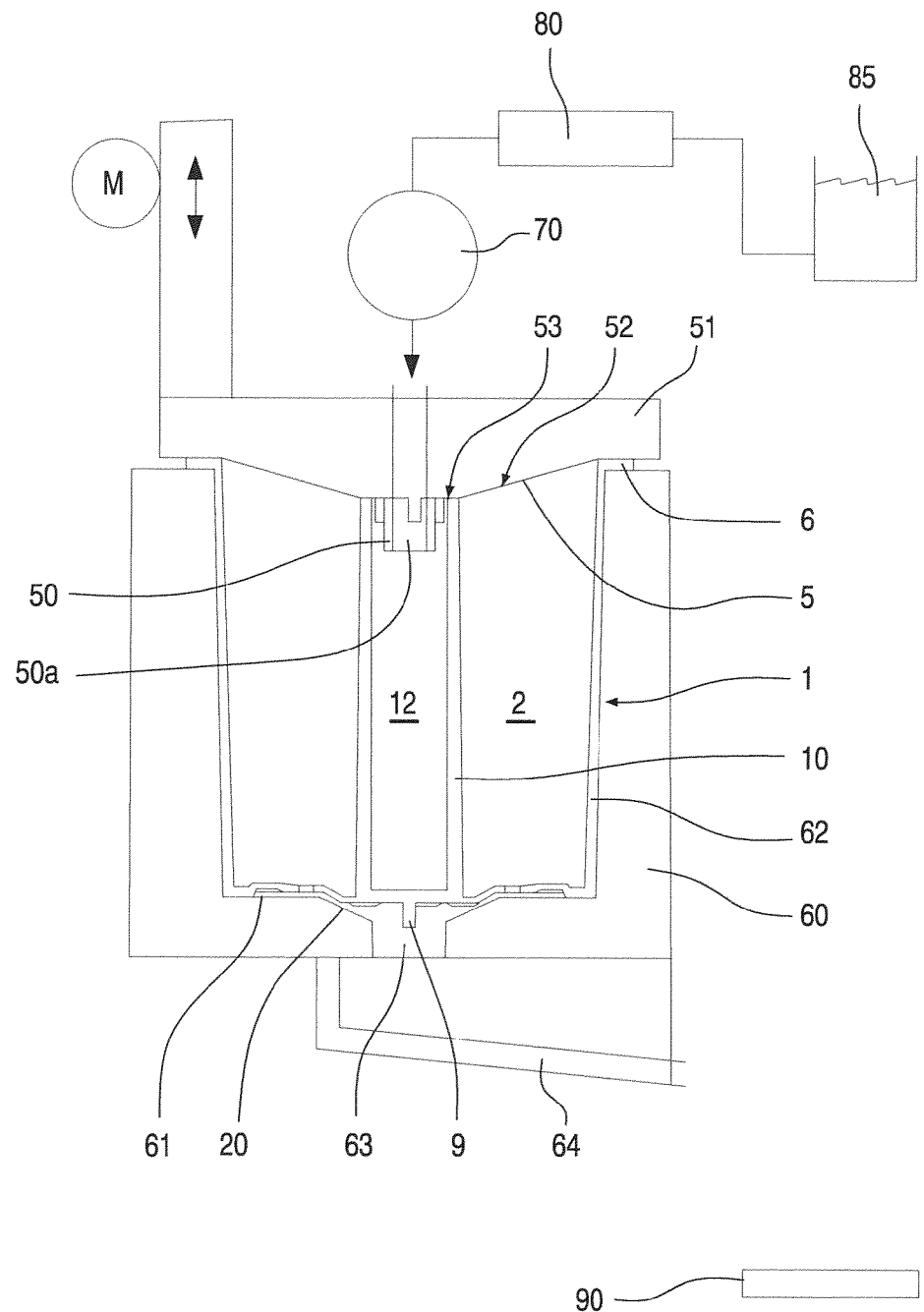
Figure 13:
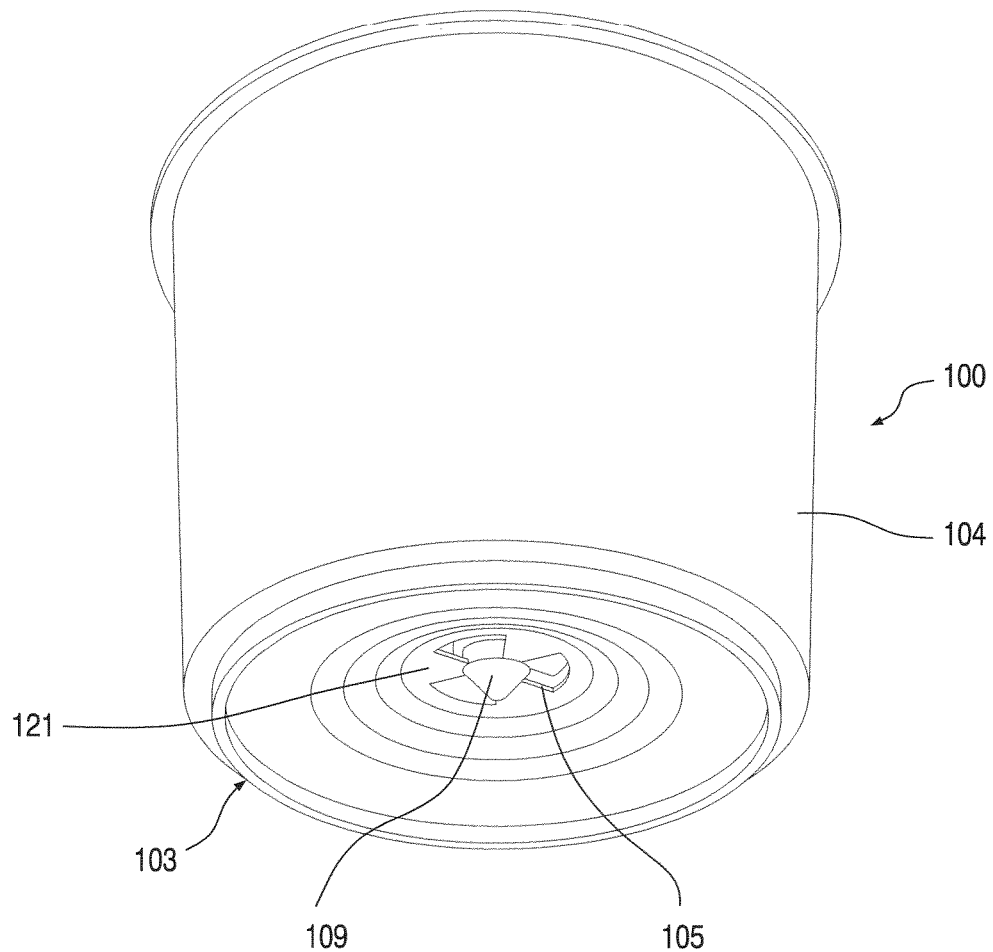
Figure 14:
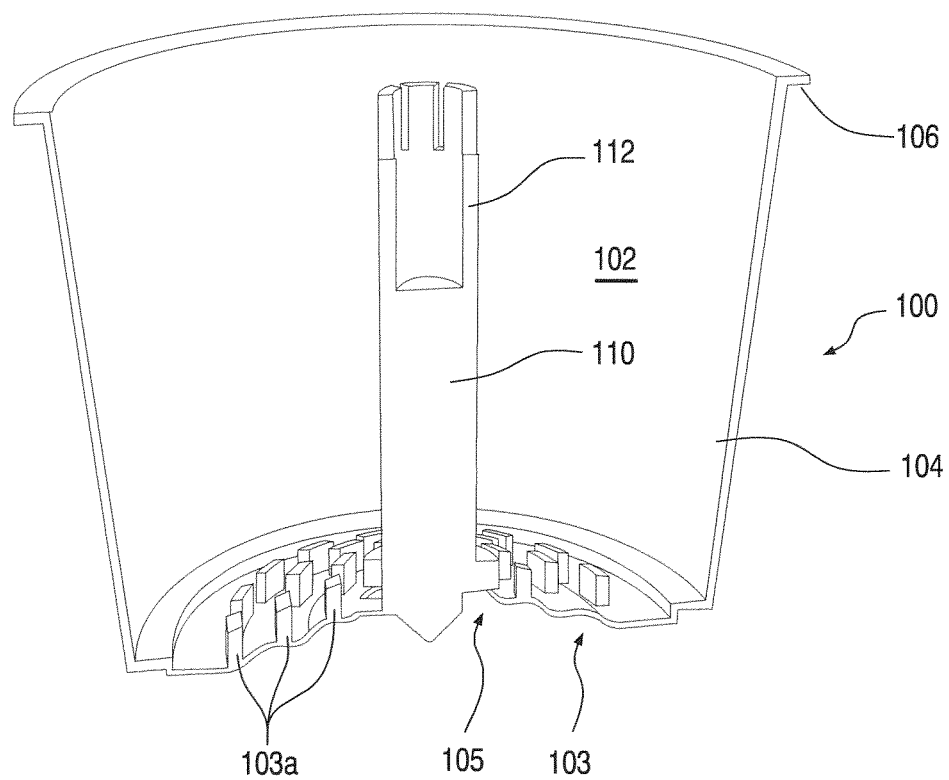
Figure 15:
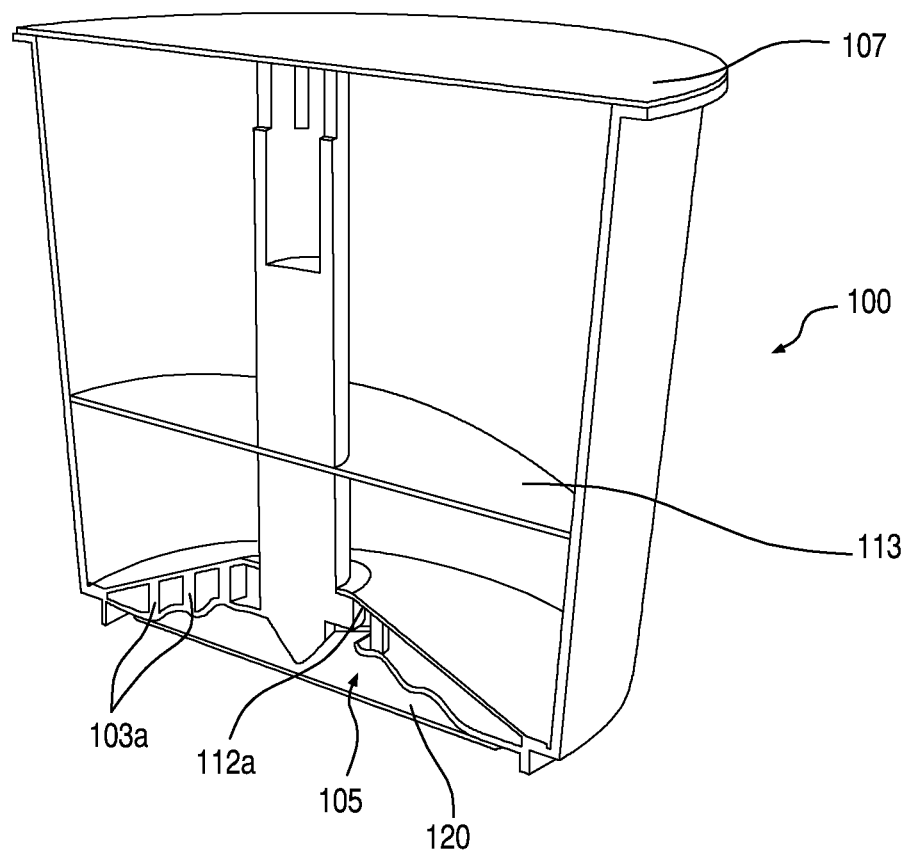

The invention will now be described with reference to the drawings. In the drawings:

FIG. 1 shows a first example of a disposable package according to the invention, FIG. 2 shows the package of FIG. 1 in a system according to the invention, FIG. 3 shows the package of FIG. 1 in original form and in used form, FIG. 4 shows the package of FIG. 1 with the bottom sealing film removed from below, FIG. 5 shows the package of FIG. 1 without filters and without top sealing film, FIG. 6 shows a second example of a disposable package according to the invention in perspective view from below, FIG. 7 shows a cross-section of the package of FIG. 6, FIG. 8 shows the package of FIG. 7 in a different orientation, FIG. 9 shows the package of FIG. 6 from above, FIG. 10 shows the package of FIG. 6 from below, FIG. 11 shows a cross-section of a portion of the package of FIG. 6, FIG. 12 shows schematically the package of FIG. 6 in a system according to the invention, FIG. 13 shows a third example of a disposable package according to the invention, FIG. 14 shows the package of FIG. 13 in cross-section, without filter member, as well as without top and bottom sealing film, and FIG. 15 shows the package of FIG. 13 without ingredient therein.

With reference to the drawings examples of a disposable package 1 according to the invention will be discussed. In as far as parts or portions of the packages that are shown are identical or similar these parts or portions are identified with the same reference numeral in the drawings.

The package 1 has a reservoir 2 that is filled with a portion of an ingredient to be combined with a base liquid, e.g. for extraction, for the preparation of a liquid product, e.g. a food product, e.g. a beverage product, e.g. a coffee product, suitable for human consumption.

In many practical applications the base liquid will be water, possibly heated water. Other base liquids are possible as well, e.g. milk.

In the examples shown in the figures the package 1 is embodied and filled with an ingredient (here ground coffee) for the preparation of a single serving of a coffee beverage. The example of FIG. 1 is in particular suitable for preparing an espresso. The package of FIGS. 13-15 is in particular suitable for preparing an Americano.

The package 1 is to be used in combination with a suitable device for the preparation of such a coffee beverage.

It will be appreciated that the package could be filled with another ingredient. It is preferred that the ingredient is granular (including powdery), but also a (thick) liquid, e.g. pasty ingredient could be arranged in the package 1.

The package 1 has an injection moulded monolithic plastic body with a bottom 3 and a circumferential wall 4. The bottom 3 adjoins the wall 4 at its outer periphery.

Preferably the wall 4 is circular in horizontal section, e.g. conical in side view, but other cross-sectional shapes are also possible, including shapes that are not rotational symmetric.

Preferably the wall 4 is conically tapering with a greatest cross-section at the top end in order to enhance the injection moulding process, as well as the receipt of the package in a holder of a preparation device, e.g. holder 60.

The upper edge of the circumferential wall 4 bounds an aperture, which is hermetically sealed by a top sealing film 5 (indicated in FIGS. 1 and 12) that is fixed on its circumference on the upper edge. Here the upper edge includes a monolithically moulded outward extending circumferential flange 6, onto which the film 5 has been adhered, e.g. using a heat-sealing technique.

The plastic body furthermore has a central column 10 which is at its lower end integral with the centre of the bottom 3, which column 10 projects upwards from the bottom 3 to an upper end 11 of the column.

The reservoir 2 of the package 1 surrounds this column 10.

A channel 12 extends in the column 10 from an inlet 12a at the upper end of the column 10 to a blind end of the channel, here, as is preferred to reduce the amount of plastic and facilitate the injection moulding process, located near the bottom 3.

As is preferred the column 10 is free-standing in the reservoir 2, with no moulded connection portions to the remainder of the moulded cup body other than its lower end.

As is preferred the column 10 has either a uniform outer cross-section over its entire height or a tapering outer cross-section (as shown here), e.g. conical, e.g. tapering to a smaller diameter in upwards direction. This enhances the injection-moulding process as no portion of the outer face of the column hinders ejection of the body from the mould.

As is preferred the channel 12 is embodied with a tapering inner cross-section, e.g. tapering to a smaller diameter in upwards direction. This enhances the injection-moulding process as no portion of the inner face of the column hinders ejection of the body from the mould.

The top sealing film 5 is breakable, here as is preferred pierceable, so that a base liquid feed lance 50 (see FIGS. 2 and 12) can be passed through the top sealing film 5 and then be engaged with the upper end of column 10. This is done such that the lance 50 can dispense base liquid into the channel.

Sealing films suitable to act as film 5 are generally known, e.g. single layer or multilayer films, e.g. including a metallic layer when barrier properties are desired, e.g. including a heat or induction sealable layer to obtain a reliable seal to the upper edge, here flange 6, after filling the reservoir with the ingredient.

The column 10, here—as is preferred—at its upper end 11, is provided with one or more apertures 15 that are in communication with the channel 12 in the column and with the reservoir 2, so as to allow base liquid that is dispensed from the feed lance, to flow to and through the one or more apertures 15 and then into the reservoir 2 to be combined with the ingredient therein.

As is preferred the one or more apertures 15, here multiple apertures 15, in the column 10 are formed as indentations between raised protruding bosses 15a at the upper end of the column 10. This is beneficial for the injection moulding of the package, e.g. compared to making apertures that are spaced a distance from the upper end of the column. Also in this way the base liquid is introduced at a great height above the bottom 3 into the reservoir, here, as is preferred, at the maximum height as the column 10 has a height such that its upper end 11 lies substantially in the plane of the film 5. Here, as preferred, in the initial position, the upper end 11 of the column 10 extends up to the top sealing film 5. FIGS. 5,7,8 and 14 clearly show the indentations and the bosses 15a.

In the first example shown in FIGS. 1-5 it is envisaged that the injection moulded bottom 18 is not provided with filter holes, but with discharge openings for the liquid product. The retaining function for the ingredient here is obtained by an annular filter 70 above the bottom of the plastic body which has a central opening through which the column projects. The inner and outer circumference of the filter are secured to the plastic body.

As is preferred the filter 70 is made of one or more layers of a filtering material, e.g. filter paper or plastic filtering material, e.g. a microperforated foil.

The bottom 3 is embodied in the second example (as shown in FIGS. 6-11) as a filter bottom, which is then, as is then preferred, in direct contact with the ingredient, so without interposition of any substrate, e.g. filtering web, between the bottom 3 and the ingredient, e.g. ground coffee.

The filter bottom 3 has a multitude of filter holes 18, e.g. at least 10 holes, said holes being formed in the process of injection moulding the plastic body, so that the liquid introduced via the feed lance into the reservoir 2 interacts with the ingredient (e.g. through extraction) and the product thus obtained flows out of the reservoir 2 via the filter bottom 3.

As is preferred the filter holes 18 are dimensioned such that at least a major portion of the granular ingredient, here ground coffee, is retained in the reservoir during the process of preparing the product, e.g. for ground coffee oils and fine solids escaping through the holes along with the coffee product.

In all three embodiments shown in the drawing, the bottom 3 has an annular flexible portion around the column 10 such that the column 10 is movable, here as is preferred elastically movable, downwards from an initial position (see FIGS. 6-11, 1, 3 left-hand side) to a lower operative position (see FIG. 12, 2, 3 right-hand side) through engagement with feed lance 50 and suitable relative displacement of the feed lance 50 and the package 1.

As is preferred, when filter holes are present, the filter holes are provided at least in said annular flexible portion.

The package 1 is preferably provided with a bottom sealing film 20 that is fixed at its circumference to the plastic body and extends underneath the bottom 3. The bottom sealing film 20 is adapted to break upon relative motion of the column 10 and of the bottom 3 to the lower operative position, said breakage creating one or more outflow openings in the bottom sealing film allowing for outflow of the obtained product from the package (see FIGS. 2 and 12).

Sealing films suitable to act as film 20 are generally known, e.g. single layer or multilayer films, e.g. including a metallic layer when barrier properties are desired, e.g. including a heat or induction sealable layer to obtain a reliable seal to the body of the package, here flange rigid segment 3d in the first example, preferably prior to filling the reservoir with the ingredient.

Preferably neither the film 5 not the film 20 are provided with any preformed weakening, e.g. groove or grooves to a portion of its thickness, e.g. made by laser, that would enhance rupturing of the film for the passage of the lance or for the creation of an outflow opening. Providing such weakenings may harm the barrier properties of the film, as well as increase cost of the package.

As is preferred the bottom 3 is provided with at least one integrally moulded cutter member 9 on its underside, facing the bottom sealing film 20. Here, as is preferred, a single cutter member 9 is provided on the bottom, arranged centrally below the column 10. In the first example the cutter member 9 is pointed and has one or more passages, here between the ribs of the cutter member, through which product can flow upon dispensing of the product.

The cutter member 9 enhances the breaking of the bottom sealing film 20 so as to form an outflow opening for the obtained product.

As is preferred, the bottom 3 is provided on its underside with multiple integrally moulded spacer formations 22 that are adapted to keep the bottom sealing film 20 spaced from the filter bottom 3 as well as to support the filter bottom 3 in the operative position of the bottom (see FIGS. 4 and 12). These spacer formations 22 effectively maintain a space between the bottom 3 and the bottom sealing film 20 in the lower operative position of the bottom.

As is preferred the spacer formations 22 are distributed over the entire surface of the bottom 3, e.g. at least at 10 positions.

In the first example it is shown, by way of example, that these formations are formed as ribs extending as circle segments in coaxial arrangement around the centre of the bottom 3 (see FIG. 4). Other formation shapes and arrangements on the bottom are also possible.

The product emerging from the filter holes or discharge openings enter this space and flows towards the one or more outflow openings, preferably a single outflow opening centrally in the bottom sealing film, here formed primarily by the cutter member 9.

The package 1 is shown in FIGS. 12 and 2 as a part of a system for the preparation of a liquid product, e.g. a food product suitable for human consumption, for example a beverage or a component of a beverage, e.g. coffee.

The system comprises the package 1 and also a device for the preparation of a liquid food product such as coffee that is only highly schematically depicted in those FIGS. 12 and 2.

The device is provided with a holder 60 for accommodating and retaining the package 1 at a dispensing position in the device, e.g. the holder being embodied as a drawer that can be slided into a device as is known in the art of coffee preparation devices.

The device further more is provided with a base liquid feed assembly, here a water feed assembly, with a base liquid feed lance 50 that disposed at the dispensing position in the device.

The feed lance 50 is adapted to be passed through the top sealing film 5 of the package 1, here, as is preferred by piercing the top sealing film, and to connect to the channel 12 in the column 10 of the package 1, so that base liquid (water) can be fed to the channel 12 through the feed lance 50 and via said channel, and apertures 15, introduced into the reservoir 2 so as to interact with the ingredient therein, e.g. through extraction.

The device comprises an operable displacement assembly which is adapted to produce a movement of the holder 60 for the package 1 and the feed lance 50 relative to each other, so that when the displacement assembly is operated the feed lance 50 passes through the top sealing film 5, engages on the column 10 as well as connects to the channel 12 therein, for example piercing the top sealing film, the engagement of the lance 50 on the column 10 and continued relative displacement pressing the column 10 downward relative to the remainder of the package to reach the operative position, thereby breaking the bottom sealing film 20 (here with cutter member 9) and creating at least one outflow opening therein allowing the liquid product to be dispensed through the outflow opening. This operative situation is shown in FIG. 12. The operable displacement assembly may comprise a drive M as shown in FIG. 12.

As is preferred the feed lance 50 is incorporated in a counter member 51 that is adapted so that the flange 6 of the package 1 is clamped between the counter member 51 and the holder 60.

As is preferred the counter member 51 has a face 52, preferably conical, engaging on the top sealing film 5 so as to support the sealing film in the operative position as base liquid pressure may, or preferably (e.g. for espresso) is developed inside the reservoir 2.

As is illustrated in FIGS. 2 and 12, and as is preferred, the one or more apertures 15 in the column 10 are located at a greater height above the filter bottom 3 then the one or more dispensing openings, here a single opening 50a at the front face of the lance, of the feed lance 50 when a front end portion of said feed lance 50 is inserted into the channel 12. The front end portion of the feed lance 50 is dimensioned so as to leave a passage, here as is preferred an annular passage, between the feed lance 50 and the column 10 such that said one or more dispensing openings in the feed lance are in communication with said apertures 15 in the column.

The feed lance 50 preferably comprises a shoulder 53 engaging on the upper end of the column, here integrated with the counter member 51, said shoulder clamping the top sealing foil in between the shoulder and the column 10.

As is illustrated, and as is preferred, the front end face of the feed lance 50 is spaced from the blind end of the channel when the lance is inserted into the channel 12.

As is illustrated the holder 60 for the package 1 forms a cavity that is adapted to receive the package 1, with a bottom support surface 61 and a circumferential surface 62. The bottom support surface 61 has a central opening 63 through which the product that has been prepared passes, possibly contactless, upon outflow of product from the package 1.

As is preferred for the stepped bottom type package in FIG. 12 the bottom support surface 61 slopes downwards towards the central opening 63, preferably the shape of the surface being adapted to the desired shape of the bottom 3 in the operative position.

In FIG. 2 it is envisaged that the bottom support surface is horizontal, the bottom sealing film 20 coming to lie against said surface without being strained too much.

In the operative position shown in FIGS. 2 and 12 the feed lance 50 causes the bottom 3 to be pressed towards the bottom support surface 61 of the cavity, such that the spacer formations 22 support the bottom 3 at multiple distributed local points, and such that the bottom sealing film 20 is clamped between said multitude of spacer formations 22 and the bottom support surface 61 of the cavity. This allows for maintaining the space between the film 20 and the main wall of the bottom 3 in an effective manner, as well as for a desirable flow of product through said space towards the outflow opening created in the film 20.

The skilled person will appreciate that the base liquid supply means preferably include a pump 70 for the base liquid, e.g. an electric pump, to supply base liquid to the lance, e.g. the pump being embodied to supply liquid at at least 5 bar, e.g. at 19 bar. Alternatively, the pump can be adapted to supply liquid at a low pressure, e.g. between 1.2 and 2.0 bar.

In a practical embodiment the base liquid feed means of the device comprise a heating assembly 80 for heating the liquid, preferably an electric heating assembly for supplying hot, not boiling liquid, preferably water, preferably hotter than 70° C.

In a practical embodiment the base liquid feed means comprise a supply storage tank 85 for storage of a supply of the liquid.

In a practical embodiment the preparation device is embodied such that the lance 50 is stationary in the device, and that displacement means are equipped to move the holder 60 supporting the package towards the lance and away from it, in such a way that in the process the lance connects to the package.

In another, more preferred, practical embodiment the lance 50 is disposed in the preparation device so as to be movable and is movable by means of corresponding first displacement means (M in FIG. 12) of the device. For example the lance 50 is mounted in vertically slidable in the device, e.g. operated by a crank shaft and lever mechanism, e.g. using an electric drive motor.

In another embodiment not only the lance 50 is movable in the device, but also the holder for the package is movable by means of corresponding second displacement means of the device, in which during use of the system when the second displacement means are operated the holder and the package accommodated and retained in it move to the dispensing position in the device, and in which when subsequently operated, preferably on the basis of a specific operation instruction from the user, the first displacement means move the lance in such a way that the lance connects to the package, e.g. pierces the top sealing film, e.g. is introduced into a channel of a column in the package.

In a practical embodiment the holder 60 is a horizontally mobile, e.g. drawer-type, holder for the package 1.

In a practical embodiment the holder 60 is equipped to accommodate and retain the package in a substantially horizontal position, the holder having an aperture 63 below the projected outflow aperture of the package 1 to receive the stream of product. The aperture 63 of the holder can be such that during dispensing of the product, the product stream remains clear of the holder. In another embodiment, shown here, the holder 60 comprises a duct 64 leading the stream of product to a remote dispensing aperture.

In a practical embodiment—at a distance below the dispensing position of the holder for the package—the device has a standing platform 90 for a beverage holder, for example a mug.

In a practical embodiment the preparation device is furthermore provided with an additional preparation and dispensing assembly for preparing, on the basis of a second ingredient, which differs from the ingredient in the package 1, a second, different food product suitable for human consumption, for example a foamed milk, e.g. as the package 1 contains an ingredient to prepare coffee.

In a practical embodiment the additional preparation and dispensing assembly is adapted for accommodating and retaining a second disposable package filled with the second ingredient, for example a foamed milk preparation ingredient, e.g. a liquid milk product. In a practical embodiment the second package differs from the package 1, at least as regards its dimensions.

In a practical embodiment the second ingredient is intended for combination with the same base liquid as the ingredient in the package 1, for example with water (e.g. hot water), in which case the additional preparation and dispensing assembly is connected to the liquid feed means and is adapted to dispense the second ingredient combined with the liquid.

In a practical embodiment the first and/or second package is filled with a single portion of the ingredient, so as to obtain a single serving of the product.

In a practical embodiment the device comprises a common carrier for a first and for a second package, which carrier forms the holder 60 for the first package and for the second package.

In a practical embodiment the second package is embodied as a disposable package having a reservoir filled with a portion of an ingredient to be mixed with a base liquid, for the preparation of a liquid product, e.g. a food product suitable for human consumption, e.g. foamed milk, which package has an injection moulded monolithic plastic body with a bottom and a circumferential wall, an upper edge of the circumferential wall bounding an aperture, which is hermetically sealed by a top sealing film fixed on its circumference on the upper edge, the plastic body furthermore having a central column which is at its lower end integral with the centre of the bottom, which column projects upwards from the bottom to an upper end of the column, the reservoir of the package surrounding said column, wherein a channel extends in the column from an inlet at the upper end of the column to a venturi portion of the channel, wherein the top sealing film is breakable, preferably pierceable, so that a base liquid feed lance can be passed through the top sealing film, be engaged with the upper end of column, and dispense base liquid into the channel, wherein the bottom has an annular flexible portion around the column such that the column is movable, preferably elastically movable, downwards from an initial position to a lower operative position through engagement with feed lance and suitable relative displacement of the feed lance and the package, wherein the package is provided with a bottom sealing film fixed at is circumference to the plastic body and extending underneath the bottom, which bottom sealing film is adapted to break upon relative motion of the column and of the bottom to the lower operative position, said breakage creating one or more outflow openings in the bottom sealing film allowing for outflow of the obtained product from the package, and wherein one or more passages formed in the column for the ingredient are connected to the venturi portion, in such a way that when base liquid is fed through the channel a venturi effect occurs and the ingredient goes from the reservoir through the one or more passages into the venturi portion and mixes there with the base liquid, which mixture is dispensed at the outflow aperture of the channel at the lower end of the column.

In a practical embodiment the column 10 of the package 1 (when present in combination with a flexible bottom 3 of the package) is movable between a higher initial position and a lower operative position relative to the upper edge of the body, preferably with a height difference of at least 3 millimeters.

In a practical embodiment the plastic body of the package 1 is designed such that it forms a supporting surface of the package, which supporting surface lies at a distance below the bottom sealing film 20, so that the bottom sealing film lies higher up than any bearing surface when the package is placed on it.

In the embodiments shown here the circumferential wall projects below the bottom 3 and has a lower edge which forms a supporting surface of the package, so that the package can be placed with the lower edge of the circumferential wall in a stable position on a bearing surface and the bottom sealing film 20 in this case lies higher up than said bearing surface.

With reference to FIGS. 1-5 now some details of the first embodiment will be discussed.

The bottom cutter member 9 has a central portion 9*a* and multiple cutting blades 9*b* extending from said central portion outward, preferably, radially, such that in the lower operative position the liquid product flows out of the space between the bottom and the bottom sealing film via spaces formed between said cutting blades 9*b*.

As is preferred the central portion 9*a* has a blunt end face adapted to bear against the bottom sealing film 20 in the initial position, and the cutting blades 9*b* each have a cutting edge that is at least over part of its length recessed with respect to the blunt end face, e.g. arranged at an incline wherein the inner end of a cutting edge is spaced from the bottom sealing film and an outer end is closer to the bottom sealing film or engaging said bottom sealing film in said initial position.

In the initial position the innermost end of the bottom 3 that adjoins the column 10 is at a greater distance from the bottom sealing film 20 than the outermost end of the bottom 3. The flexible portion of the bottom 3 is flattened when the column 10 is brought in the lower operative position.

The bottom 3 is shown in an embodiment in which it comprises an annular gutter 200 that is preferably free of discharge openings. The gutter 200 is arranged adjacent the inner side of circumferential wall 4 of the plastic body. The gutter has a raised inner wall portion 200a that is raised above the bottom portion of the annular gutter. The flexible portion of the bottom 3 is arranged within the central inner contour of annular gutter 200, the outer edge of the flexible bottom is integral with the top of the raised inner wall portion of the gutter 200. This arranged contributes to the flexing of the bottom during lowering of the column, as well as enhances liquid flow in the package during dispensing.

As is preferred a circumferential flange 201 extends on the inner face of the circumferential wall 4 of the plastic body to a top end of a raised outer wall portion of the annular gutter 200. This outer gutter wall portion is spaced from the circumferential wall of the plastic body. As is preferred the annular filter 70 is secured to a top face of said circumferential flange 201.

As is preferred a perforated or permeable top cover sheet 210 is provided to contain the ingredient between said top cover sheet 210 and the annular filter 70, said cover sheet allowing the passage of base liquid there through. The cover sheet is at its outer circumference secured to the inner face of the circumferential wall of the plastic body and at its inner circumference to the column at a position below said one or more apertures 15. Here the cover sheet has upwardly folded portions at its inner and outer circumference that are secured to the column and the circumferential wall respectively.

As can be seen in FIG. 4 the discharge openings 18 are preferably arranged on concentric circles, with circle segment shaped ribs 22 between the coaxial groups of openings 18. The circle segments shaped ribs 22 on a common radius are spaced from one another to allow for the passage of the liquid product towards the centre region of the bottom where—in this example—the cutter member 9 with cutting blades 9b is provided.

With reference to FIGS. 6-12 now some details of the second embodiment will be discussed.

In the second embodiment the flexible portion of the filter bottom 3 presents multiple coaxial annular segments 3a-c, an innermost segment 3a adjoining the lower end of the column 10, an outermost segment 3c adjoining the circumferential wall of the plastic body (here via an outer rigid annular segment 3d of the bottom 3). In this embodiment an intermediate annular segment 3b is present as well, in between the segments 3a and 3c.

As is preferred multiple annular segments, here 3a, 3b and 3c, are each provided with multiple filter holes that are distributed in circumferential direction of the segment.

As can be seen in FIG. 7—in the initial position—the innermost segment 3a is at a greater height above the bottom sealing film 20 than the outermost segment 3c of the flexible portion, each possible intermediate segment, here 3b, being at an intermediate height, said height increasing stepwise from the outermost segment towards the innermost segment.

As is preferred for a bottom with filter holes at least one, here a single, spacer formation 22 is provided at of near each filter hole or each group of filter holes. The same arrangement may be provided for a bottom with discharge openings.

As is illustrated here, as is preferred, the filter holes 18 are arranged in groups of multiple holes, here four holes, the distance between filter holes within a group being less than the distance between neighbouring groups of filter holes.

As is illustrated for the second example, as is then preferred, at least one spacer formation 22 is provided at each group of filter holes 18, preferably a single spacer formation 22.

In this example a star shaped spacer formation 22 is employed, which is preferred. The formation 22 has a central portion 22a and multiple arms 22b, here four, directed away from said central portion. The filter holes, here four in a group, are each located between adjacent arms of the spacer formation 22. So as can be clearly seen here four filter holes are present in combination with a four armed star shaped spacer formation 22.

As can be best seen in FIG. 11 a portion of the filter bottom 3 wherein a group of multiple filter holes is moulded has filter bottom wall between an upper surface and a bottom surface thereof. A bore common 25 that is common for the group of filter holes extends through said wall, here a cylindrical bore but other shapes are also possible. The bore has a cross-section, at right angles to the direction of product flow, that is greater than the combined cross-section of said filter holes, so as to achieve the effect that the bore 25 forms a lesser resistance to product flow than the filter holes.

A spacer formation 22 is integrally moulded onto the bottom surface of said wall portion. This spacer formation extending across the projection of the bore 25 (see views from top and bottom) and has a top surface that is coplanar with the bottom surface of the wall. In this manner at least two, here four, filter holes are created in an effective manner in the injection moulding process. These holes each have a cross-section that is coplanar with said bottom surface. Also these holes have substantially no axial extension, so no effective length. This avoids both manufacturing problems as well as avoids clogging of the hole during the preparation of the product, which could impair product quality and/or the preparation process (e.g. time).

It is illustrated, as is preferred, that the central portion 22a of the spacer formation is arranged in the projection of the centre of the common bore 25. This portion 22a has a cross-section (seen in the plane of the wall onto which it is moulded) that is smaller than the bore 25 at the bottom surface of said wall. The arms 22b extend from said central portion 22a outward, so as to form said multiple filter holes, here, as is preferred, four filter holes.

With reference to FIGS. 13-15 now a third example of a disposable package according to the invention will be discussed.

In this example, as is preferred, the package 100 is embodied and (to be) filled with an ingredient (here ground coffee) for the preparation of a single serving of a coffee beverage, in particular an Americano, so a large volume single serving of coffee.

The package 1 is to be used in combination with a suitable device for the preparation of such a coffee beverage.

The disposable package 100 has a reservoir 102 that is filled (not shown) with a portion of an ingredient to be combined with a base liquid, e.g. for extraction, for the preparation of a liquid product, e.g. a food product suitable for human consumption, here—as is preferred—ground coffee.

The package 100 has an injection monolithic moulded plastic body with a bottom 103 and a circumferential wall 104. A flange 106 forms an upper edge of the circumferential wall and bounds an aperture which is hermetically sealed by a top sealing film 107 fixed on its circumference to the upper edge.

The plastic body furthermore has a central column 110 which is at its lower end integral with the centre of the bottom. The column 110 projects upwards from the bottom to an upper end of the column, here to the underside of the foil 107 as is preferred. The reservoir of the package surrounds said column.

As can be seen a channel 112 extends in the column from an inlet at the upper end of the column to a blind end.

The top sealing film 107 is breakable, preferably pierceable, so that a base liquid feed lance can be passed through the top sealing film, be engaged with the upper end of column, and dispense base liquid into the channel.

The column 110, preferably at its upper end, is provided with one or more apertures that are in communication with the channel in the column and with the reservoir, so as to allow base liquid that is dispensed from the feed lance, to flow to and through the one or more apertures and then into the reservoir to be combined with the ingredient therein. As is preferred said one or more apertures in the column are formed as indentations between raised protruding bosses at the upper end of the column.

Spaced above the bottom 103 of the plastic body an annular filter member 113 of suitable filtering material is mounted in the plastic body. e.g. the filtering material is a film with filter holes or another filtering layer or layers. The filter member 113 is thus preferably made from a sheet material, preferably of plastic (foil) or paper. The member 113 is made separate from the plastic body and mounted thereto, e.g. by heat sealing or with an adhesive.

The filter member 113 has a central opening through which the column 112 projects. The inner circumference and outer circumference of the filter member 113 are fixed to the plastic body.

As is preferred the bottom is moulded with a multitude of raised spacer formations 103a that are distributed over the surface of the bottom and extend upwardly from a main wall of the bottom to support the filter member 113 and maintain a space between the filter 113 and the bottom 103.

The bottom 103 is embodied as a closed bottom with a number of discharge openings 105 for discharge of the product that has passed through the filter 113.

Here—as is preferred—three discharge openings 105 are arranged in the bottom adjacent the foot portion of the column 110, so that the liquid introduced via the feed lance into the reservoir interacts with the ingredient and the product thus obtained flows out of the reservoir through the filter 113 and then the one or more discharge openings 105 in the bottom.

It is envisaged that a significantly lower pressure of water (e.g. between 1.2 and 2.0 bar) is employed than with the earlier described preparation of an espresso. The filter member 113 is sufficiently strong and supported in the plastic body (by its circumferential fixation as well as the preferred formations 103a) to stay intact under the force of the water during preparation of the food product. The cross-section of the reservoir 102 may be significantly larger than in an espresso package, e.g. to hold 10 grammes, e.g. between 8 and 15 grammes of ground coffee.

The bottom 103 has an annular flexible portion around the column 110 such that the column is movable, preferably elastically movable, downwards from an initial position to a lower operative position through engagement with feed lance and suitable relative displacement of the feed lance and the package.

Preferably, in the initial position,—as shown here—the upper end of the column 112 extends up to the top sealing film.

The package is provided with a bottom sealing film 120 fixed at is circumference to the plastic body and extending underneath the bottom 103, which bottom seal film is adapted to break upon relative motion of the column 112 and of the bottom 103 to the lower operative position, said breakage creating one or more outflow openings in the bottom sealing film allowing for outflow of the obtained product from the package.

It will be appreciated that with the one or more discharge openings 105 near the cutter member 109, the product can easily flow out through the aperture made in the film 120. There is no need for keeping a space between the major portion of the film 120 and the bottom 103 as with the previously discussed embodiments.

In a preferred embodiment—as shown here—the bottom is provided with a single cutter member 109 on the bottom arranged centrally below the column 112, said cutter member enhancing the breaking of the bottom sealing film 120 so as to form an outflow opening for the obtained product.

In the practical embodiment shown here the bottom has three discharge openings 105 adjacent the foot of the column 112.

In the practical embodiment shown here a foot portion of the lance includes a circumferential shoulder 112a onto which the filter member 113 is fixed with its inner circumference.

In a practical embodiment a foot portion of the lance 112 comprises multiple radial arm segments 121, preferably three radial arm segments 121. The radial arm segments 121 are integral at an outer end thereof with the bottom of the plastic body. A discharge opening is delimited between a pair of arm segments.

In the practical embodiment, not shown here the lance 112 has a foot portion with a conical face 112a, e.g. continuous with a conical cutter member, having a downwardly directed tip forming a single cutter member of the package. The one or more discharge openings are then preferably oriented with their main cross-section substantially vertically such that the flow of product is deviated by contact with said conical face towards the outflow opening formed by action of the cutter member.

The invention claimed is:

1. A disposable package having a reservoir filled with a portion of an ingredient to be combined with a base liquid for the preparation of a liquid product, said package having an injection moulded monolithic plastic body with a bottom having an outer periphery and a circumferential wall joining said bottom at said outer periphery thereof, an upper edge of said circumferential wall bounding an aperture which is hermetically sealed by a top sealing film fixed on a circumference thereof to said upper edge, the plastic body furthermore having a central column which is at its lower end integral with a centre of the bottom, said column projecting upwards from said bottom to an upper end of said column, wherein said reservoir of the package surrounds said column and is bounded by said bottom, said circumferential wall, and said top sealing film, wherein said ingredient is in direct contact with said bottom without interposition of a filtering web, wherein a channel extends in said column from an inlet at said upper end of the column to a blind end, wherein the top sealing film above said inlet is pierceable by a base liquid feed lance allowing said feed lance to dispense base liquid into said channel, wherein said column at said upper end thereof, is provided with indentations between raised protruding bosses, wherein said indentations are in. communication with said channel in said column and with said reservoir, so as to allow said base liquid that is dispensed from said feed lance to flow to and through the indentations and then into the reservoir to be combined with the ingredient therein, wherein the bottom is embodied as a closed bottom with a multitude of filter holes, so that said liquid introduced via said indentations into said reservoir interacts with the ingredient and the liquid product thus obtained flows out of said reservoir through said filter holes in said bottom, wherein said bottom has an annular flexible portion around said column such that said column is movable downwards relative to said circumferential wall of said plastic body from an initial position to a lower operative position through engagement with said feed lance and relative displacement of said feed lance and said package, wherein said multitude of filter holes is provided in said annular flexible portion of said bottom, wherein said multitude of filter holes have been formed as said plastic body is injection moulded, wherein said bottom has a rigid annular region around said annular flexible portion, and wherein said package is provided with a bottom sealing film fixed at a circumference thereof to said rigid annular portion of said plastic body and extending underneath said flexible portion of said bottom, which said bottom sealing film is adapted to break upon relative motion of said column and of said flexible portion of said bottom relative to said circumferential wall from said initial position to said lower operative position, said breakage creating one or more outflow openings in said bottom sealing film allowing for outflow of said liquid product from the package.

2. The package according to claim 1, wherein said bottom is provided with at least one integrally moulded cutter member on an underside thereof, facing said bottom sealing film, said cutter member enhancing said breaking of said bottom sealing film so as to form said one or more outflow openings for said liquid product.

3. The package according to claim 2, wherein said bottom cutter member has a central portion and multiple cutting blades extending from said central portion outward, such that in said lower operative position said liquid product flows out of a space between said bottom and said bottom sealing film via spaces formed between said cutting blades.

4. The package according claim 3, wherein said central portion has a blunt end face adapted to bear against said bottom sealing film in said initial position, and wherein said cutting blades each have a cutting edge that is at least over part of its length recessed with respect to the blunt end face.

5. The package according to claim 1, wherein said bottom is provided on an underside thereof with multiple integrally moulded spacer formations that are adapted to keep said bottom sealing film spaced from said bottom as well as to support said bottom in said lower operative position, said spacer formations contacting said bottom sealing film in said lower operative position and maintaining a space between said bottom and said bottom sealing film in said lower operative position, so that said liquid product emerging from said filter holes enters said space and flows towards said one or more outflow openings in said bottom sealing film.

6. The package according to claim 1, wherein, in said initial position, an innermost end of said annular flexible portion of said bottom that adjoins said column is at a greater distance from said bottom sealing film than an outermost end of said annular flexible portion of said bottom, wherein said annular flexible portion of said bottom is adapted to be flattened when the column is brought in said lower operative position.

7. The package according to claim 1, wherein said rigid portion of said bottom comprises an annular gutter that is free of said filter holes, wherein said gutter is arranged adjacent an inner side of said circumferential wall of said plastic body, said gutter having a raised inner wall portion that is raised above a bottom portion of said annular gutter, and wherein said annular flexible portion of said bottom is encircled by said annular gutter, and wherein an outer edge of said flexible portion of said bottom is integral with a top of said raised inner wall portion of said gutter.

8. The package according to claim 7, wherein a circumferential flange extends on said inner side of said circumferential wall of said plastic body to a top end of a raised outer wall portion of said annular gutter, wherein said raised outer wall portion is spaced from said circumferential wall of said plastic body.

9. The package according to claim 1, wherein a perforated or permeable top cover sheet is provided to contain said ingredient between said top cover sheet and said bottom provided with said filter holes, said cover sheet allowing passage of said base liquid there through, said cover sheet being at an outer circumference secured to said inner face of said circumferential wall of said plastic body and at an inner circumference thereof to said column at a position below said indentations.

10. A system for the preparation of a liquid product, which system comprises the disposable package according to claim 1, and also a device, said device being at least provided with:
a holder adapted to accommodate said disposable package at a dispensing position in said device,
a base liquid feed assembly with said base liquid feed lance disposed at said dispensing position, said feed lance being adapted to be passed through said top sealing film of said disposable package by piercing said top sealing film, and to connect to said channel in said column of said disposable package, allowing said base liquid to be fed to said channel through said feed lance and via said channel and said indentations to be introduced into said reservoir so as to interact with said ingredient therein, and
an operable displacement assembly which is adapted to produce a movement of said holder for said disposable package and said feed lance relative to each other, wherein said holder is adapted to retain said circumferential wall of said plastic body of said disposable package, so that when said displacement assembly is operated said feed lance is pierced through said top sealing film, engages on said column as well as connects to said channel therein, said engagement of said lance on said column and continued relative displacement pressing said column downward relative to said circumferential wall from said initial position to reach said lower operative position, thereby breaking said bottom sealing film and creating said least one outflow opening therein allowing said liquid product to be dispensed through said at least one outflow opening.

11. The system according to claim 10, wherein said indentations in said column are located at a greater height above said bottom then said one or more dispensing openings of said feed lance when a front end portion of said feed lance is inserted into said channel of said column, and wherein said front end portion of said feed lance is dimensioned so as to leave a passage, between said feed lance and said column such that said one or more dispensing openings in said feed lance are in communication with said indentations in said column.

12. The system according to claim 10, wherein said feed lance comprises a shoulder engaging on said upper end of the column, clamping said top sealing film of said disposable package in between said shoulder and said column.

13. The system according to claim 12, wherein said shoulder is made of resiliently compressible material, and wherein said shoulder extends outwardly as far as said upper edge of said plastic body so as to clamp said top sealing film onto said plastic body during dispensing of said liquid product.

14. The system according to claim 13, wherein the shoulder has a central portion that projects further downwards than a surrounding portion of said shoulder, said central portion engaging on said upper end of said column.

15. The system according to claim 10, wherein a front end face of said feed lance is spaced from said blind end of said channel when said feed lance is inserted into said channel.

16. The system according to claim 10, wherein said holder for said disposable package forms a cavity adapted to receive said disposable package, with a bottom support surface and a circumferential surface, said bottom support surface having a central opening through which said liquid product passes upon outflow of said liquid product from said disposable package.

17. The system according to claim 16, wherein said bottom of said disposable package is provided on an underside thereof with multiple integrally moulded spacer formations that are adapted to contact said bottom sealing film and to keep said bottom sealing film spaced from said flexible portion of said bottom is aid lower operative position, wherein said spacer formations are further adapted to support said bottom in said lower operative position of said bottom on said bottom support surface of said holder, such that said liquid product emerging from said filter holes enters said space and flows towards said one or more outflow openings in said bottom sealing film, and wherein, in said operative position, said feed lance causes said bottom to be pressed towards said bottom support surface of said cavity, such that said spacer formations support said bottom, and such that said bottom sealing film is clamped between said spacer formations and said bottom support surface of said cavity.

18. The system according to claim 10, wherein said base liquid is heated water.

19. The system according to claim 10, wherein said feed lance has a single dispensing opening therein at a front end of the feed lance, said single dispensing opening having a cross-section greater than a total of a cross-section of all said indentations.

20. A disposable package having a reservoir filled with a portion of an ingredient to be combined with a base liquid for the preparation of a liquid product, said package having an injection moulded monolithic plastic body with a bottom having an outer periphery and a circumferential wall joining said bottom at said outer periphery thereof, an upper edge of said circumferential wall bounding an aperture which is hermetically sealed by a top sealing film fixed on a circumference thereof to said upper edge, the plastic body furthermore having a central column which is at its lower end integral with a centre of the bottom, said column projecting upwards from said bottom to an upper end of said column, wherein said reservoir of the package surrounds said column and is bounded by said bottom, said circumferential wall, and said top sealing film, wherein said ingredient is in direct contact with said bottom without interposition of a filtering web, wherein a channel extends in said column from an inlet at said upper end of the column to a blind end, wherein the top sealing film above said inlet is pierceable by a base liquid feed lance allowing said feed lance to dispense base liquid into said channel, wherein said column at said upper end thereof, is provided with indentations between raised protruding bosses, wherein said indentations are in communication with said channel in said column and with said reservoir, so as to allow said base liquid that is dispensed from said feed lance to flow to and through the indentations and then into the reservoir to be combined with the ingredient therein, wherein the bottom is embodied as a closed bottom with a multitude of filter holes, so that said liquid introduced via said indentations into said reservoir interacts with the ingredient and the liquid product thus obtained flows out of said reservoir through said filter holes in said bottom, wherein said bottom has an annular flexible portion around said column such that said column is movable downwards relative to said circumferential wall of said plastic body from an initial position to a lower operative position through engagement with said feed lance and relative displacement of said feed lance and said package, wherein said multitude of filter holes is provided in said annular flexible portion of said bottom, wherein said multitude of filter holes have been formed as said plastic body is injection moulded, wherein said bottom has a rigid annular region around said annular flexible portion, wherein said package is provided with a bottom sealing film fixed at a circumference thereof to said rigid annular portion of said plastic body and extending underneath said flexible portion of said bottom, which said bottom sealing film is adapted to break upon relative motion of said column and of said flexible portion of said bottom relative to said circumferential wall from said initial position to said lower operative position, said breakage creating one or more outflow openings in said bottom sealing film allowing for outflow of said liquid product from the package, wherein said bottom is provided with at least one integrally moulded cutter member on an underside thereof, facing said bottom sealing film, said cutter member enhancing said breaking of said bottom sealing film so as to form said one or more outflow openings for said liquid product, wherein said bottom is provided on an underside thereof with multiple integrally moulded spacer formations that are adapted to keep said bottom sealing film spaced from said bottom as well as to support said bottom in said lower operative position, said spacer formations contacting said bottom sealing film in said lower operative position and maintaining a space between said bottom and said bottom sealing film in said lower operative position, so that said liquid product emerging from said filter holes enters said space and flows towards said one or more outflow openings in said bottom sealing film, and wherein, in said initial position, an innermost end of said annular flexible portion of said bottom that adjoins said column is at a greater distance from said bottom sealing film than an outermost end of said annular flexible portion of said bottom, wherein said annular flexible portion of said bottom is adapted to be flattened when the column is brought in said lower operative position.

* * * * *